United States Patent [19]
Roy

[11] Patent Number: 6,049,531
[45] Date of Patent: Apr. 11, 2000

[54] REAL-TIME MULTIMEDIA CONFERENCING OVER AN ATM NETWORK USING AN INTELLIGENT ATM ADSL MODEM AND ADSL ACCESS

[75] Inventor: Radhika R. Roy, Howell, N.J.

[73] Assignee: AT&T Corp, New York, N.Y.

[21] Appl. No.: 08/892,516

[22] Filed: Jul. 14, 1997

[51] Int. Cl.[7] .......................... H04L 12/16; H04L 12/56; H04M 3/42
[52] U.S. Cl. .................. 370/260; 370/352; 370/395; 379/202; 709/204
[58] Field of Search .................. 370/352, 356, 370/395, 261, 260, 486, 487, 400, 401, 465, 466, 467, 468; 379/201, 202, 93.01; 348/14, 15, 12; 455/414, 416; 709/249, 204

[56] References Cited

U.S. PATENT DOCUMENTS

| | | | |
|---|---|---|---|
| 5,684,799 | 11/1997 | Bigham et al. | 370/352 |
| 5,751,338 | 5/1998 | Ludwig, Jr. | 370/260 |
| 5,756,280 | 5/1998 | Soora et al. | 348/12 |
| 5,844,600 | 12/1998 | Kerr | 370/260 |
| 5,903,612 | 5/1999 | Van Der Putten et al. | 370/395 |
| 5,910,970 | 6/1999 | Lu | 379/93.01 |

*Primary Examiner*—Alpus H. Hsu
*Assistant Examiner*—Afsar M. Qureshi

[57] ABSTRACT

A technique for providing real-time multimedia conferencing services with guaranteed performance, in a hybrid networking environment, by interconnecting ADSL modem-based premises networks via ADSL access networks and an ATM wide area network is disclosed. A functional design constitutes both component and protocol architecture of an ATM ADSL modem for both premises networks and head-end stations of the ATM network. The ATM wide area network may be divided into a plurality of access network domains and one backbone network domain to provide efficient and intelligent multimedia conferencing services. Each ATM access network domain has one ADSL modem server as well as access multimedia bridge server, while there is only one central network server and one central multimedia bridge server within the backbone network domain.

Each ADSL modem server located in an ATM access network domain maintains necessary information of how the bandwidth of the ADSL access network is being used by existing calls, and how the ADSL line bandwidth will be allocated when new multimedia conference calls are initiated, in accordance with the desired priority and performance levels. If all conference participants are connected to the same ATM access network domain, the access multimedia bridge server of that domain will provide bridging, otherwise the central multimedia bridge will provide bridging. An integrated call control algorithm and cable modem control and signaling protocol scheme has been developed to set up multimedia conference calls that guarantee bandwidth over the ADSL access network as well within the wide area ATM network.

38 Claims, 16 Drawing Sheets

REAL-TIME MULTIMEDIA CONFERENCING OVER AN ATM NETWORK USING AN INTELLIGENT ATM ADSL MODEM AND ADSL ACCESS

FIELD OF THE INVENTION

The present invention relates in general to multimedia conferencing, between geographically dispersed locations interconnected by an asynchronous transfer mode (ATM) wide area network (WAN), using ATM asymmetric digital subscriber line (ADSL) modem access. More particularly, the present invention relates to a novel intelligent ATM ADSL modem, employing a powerful multimedia control and signaling scheme and asynchronous transfer mode (ATM) protocol, that shares the bandwidth of the asymmetric digital subscriber line (ADSL) and uses existing copper telephone lines for multimedia conferencing. An integrated call control algorithm sets up multimedia conference calls using an intelligent control and signaling protocol scheme that guarantees bandwidth over the ADSL access networks and within the wide area ATM network.

BACKGROUND OF THE INVENTION

Various methods of providing multimedia conferencing services with guaranteed performance have been developed. Multimedia conference calls require a large amount of communication bandwidth. The subscribe loop plants of most telephone companies consist primarily of unshielded twisted pair copper (UTP) access lines of approximately 24 to 26 gauge size wire. The unshielded twisted pair copper wire has an asymmetrical nature of bandwidth, due to signal attenuation, that is proportional to length and frequency, and is known as an asymmetric digital subscriber line (ADSL). A modem that uses asynchronous transfer mode (ATM) protocol and an asymmetric digital subscriber line (ADSL) to transmit and receive signals is known as an ATM ADSL modem. Currently, some ADSL modems realize downstream rates of approximately 9 megabits per second (Mbps) and upstream rates of 1.5 megabits per second (Mbps). The ADSL Forum and T1E1.4 standard organizations are now developing standards directed to the manner in which ADSL modems will carry high-speed digital signals over unshielded twisted pair ADSL lines. Recent improvements in ADSL technology have created an opportunity to provide two-way multimedia conferencing, in addition to voice communication, over an unshielded twisted pair ADSL line. Unlike "tree-type" cable television (CATV) hybrid fiber coaxial (HFC) plant topologies, an unshielded twisted pair ADSL line provides point to point dedicated bandwidth. Therefore, ADSL lines do not require a sophisticated mechanism to share the bandwidth among multiple users (as is required for IEEE 802.14 hybrid fiber coaxial (HFC) medium access control (MAC) protocol).

However, although the asymmetrical nature of the upstream and downstream bandwidth distribution of an ADSL loop plant makes it attractive for one-way communication, such as video-on-demand (VOD), it requires different intelligent networking technologies for two-way communications (especially for multimedia conferencing over an unshielded twisted pair (UTP) asymmetric digital subscriber line (ADSL) access network).

SUMMARY OF THE INVENTION

The present invention provides a system for real-time multimedia conferencing over an ATM network using an intelligent ATM ADSL modem and ADSL access. In particular, a sophisticated ADSL modem (equipped with an intelligent multimedia signaling scheme) which, when connected to a local area network (LAN), LAN hub, or switched local area network hub (SLH), of a premises network, has been designed to carry two-way multimedia signals over the pair ADSL access network efficiently (note that the LAN may be Ethernet (EN), Token Ring (TN), Fiber Distributed Data Interface (FDDI), etc.). The ADSL modem uses the ATM protocol for communication over the ADSL access network for communication among modems (hence the modem is designated an ATM ADSL modem). In addition, a second intelligent ADSL modem, connected to the ATM node/switch of the WAN, has also been designed to carry two-way multimedia signals.

Also, as disclosed herein, a plurality of ATM access network domains are used to connect to an ATM backbone network domain, all within an ATM wide area network. An ATM ADSL modem server, in each ATM access network domain, is used to allocate bandwidth over the ADSL access network in accordance with priority and performance levels for each call originating and terminating in that access network domain. If a multimedia conference call includes conference participants from other domain(s), the call is controlled by a central ATM network server, of the ATM backbone network domain, in collaboration with ADSL modem servers of the ATM access network domains.

In addition, a single access multimedia bridge server, equipped with an ADSL access network-based multimedia control and signaling protocol scheme, is provided in each ATM access network domain and is used to bridge multimedia traffic over the ADSL access network for each call originating and terminating in that access network domain. However, as with the ADSL modem server, if a multimedia conference call includes conference participants of ADSL-based premises networks from other domain(s), the multimedia traffic is bridged by a central multimedia bridge server of the ATM backbone network domain, in coordination with control and signaling information received from both the ADSL modem servers of the ATM access network domains and the central ATM network server of the ATM backbone network domain.

A novel multimedia call control algorithm allows multimedia communications to be set up between the a plurality of participants over the ADSL access network (using ATM ADSL modems to interconnect the premises networks) and the ATM wide area network.

In addition, intelligent control and signaling protocol messages have been developed and are used to communicate between different entities of the ADSL access network and the ATM wide area network.

The system described below allows for simultaneous multimedia conference participants that are both ADSL modem-based premises, and non-ADSL modem-based premises.

DETAILED DESCRIPTION

Figure 1A:
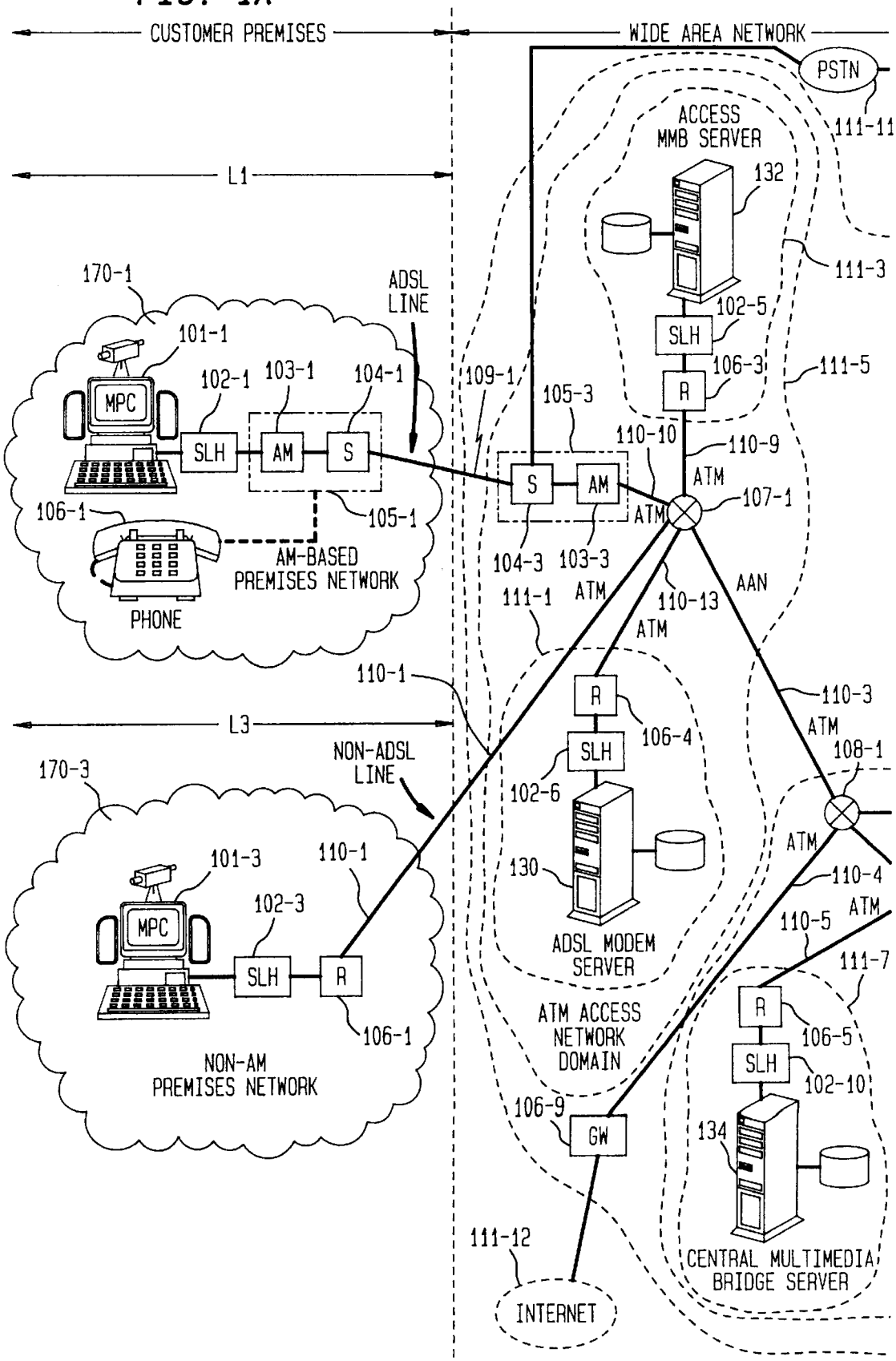
FIGS. 1A and 1B illustrates a preferred form of the system architecture of end-to-end network configurations, for providing multipoint multimedia conferencing services, in accordance with the inventive concepts.
Figure 1B:
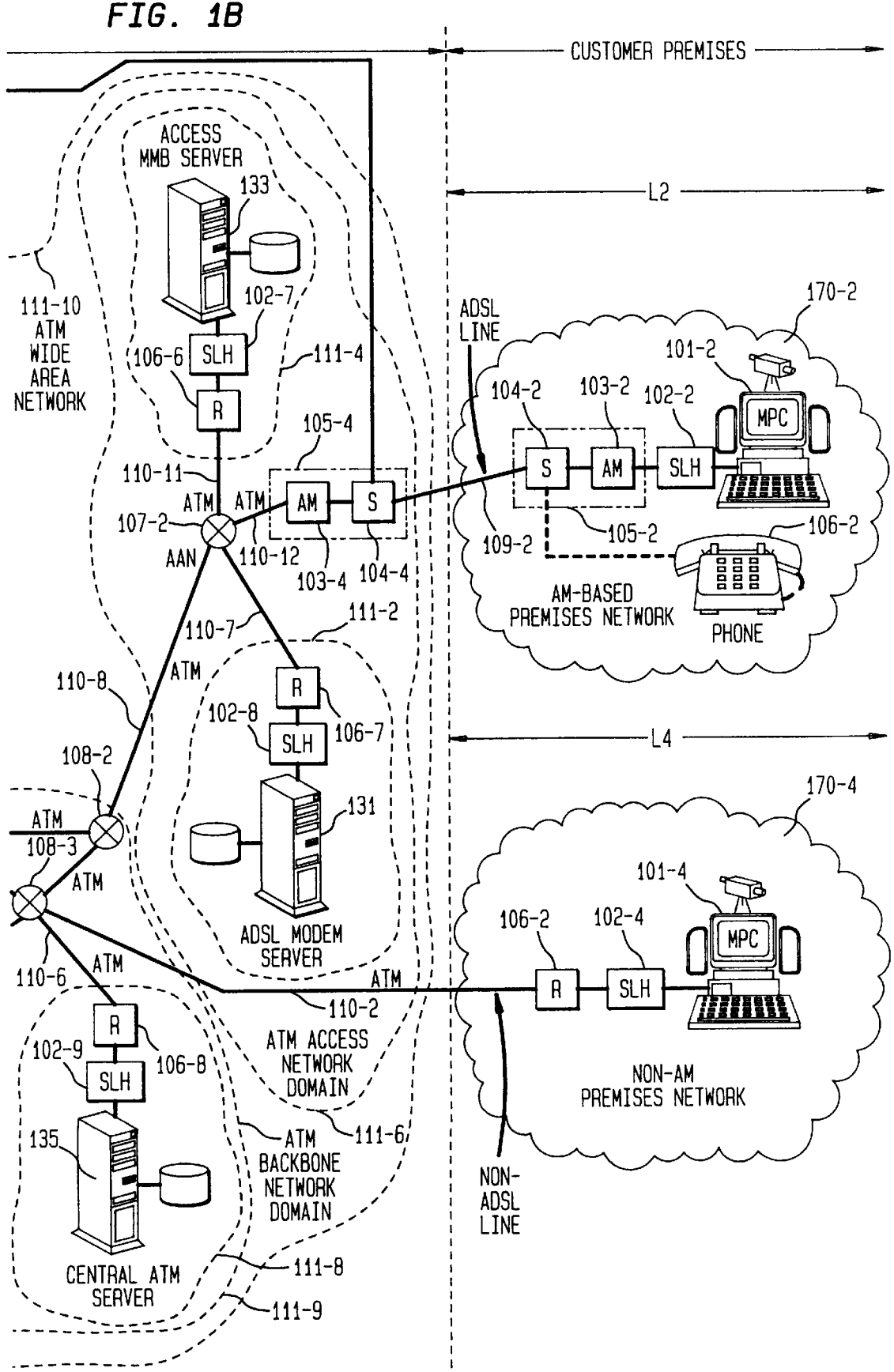

FIGS. 1A and 1B illustrates a preferred form of a multimedia conferencing system architecture, setting forth an end-to-end network configuration, including multimedia personal computers/workstations (hereinafter referred to as "MPC" for simplicity) 101-1 and 101-2 (at customer premises L1 and L2 respectively), connected to ATM ADSL modems 103-1 and 103-2 respectively, via switched local area network hubs (SLHs) 102-1 and 102-2 respectively, within ATM ADSL modem (AM)-based premises networks 170-1 and 170-2 respectively. An ADSL modem may be integrated with a plain old telephone service (POTS) splitter interface, for separate connection of a telephone (from the MPC), shown as splitter 104-1 and 104-2, in accordance with the recommendation of ADSL Forum and T1E1.4 standard organization (the inventive concepts of the application are directed to the ATM ADSL modem 103-1, 103-2, 103-3 and 103-4, not the POTS splitter, which is shown only for completeness). A complete modem is illustrated as 105-1, 105-2, 105-3, or 105-4 of FIGS. 1A and 1B. The MPC's 101-1, 101-2 are also equipped with multimedia conferencing application programs based on the H.323 standard of the International Telecommunications Union (ITU) (hereinafter refered to as "H.323 protocol" only).

At location L1, ATM ADSL modem 103-1, of the premises network 170-1, is connected to an ATM ADSL modem 103-3, of ATM access network domain 111-5, via ADSL line 109-1. ATM ADSL modem 103-3 is connected to ATM access node (AAN) 107-1, of ATM access network domain 111-5, of ATM wide area network 111-10, via ATM line 110-10. ATM access node 107-1 is connected to ATM backbone node 108-1 via line 110-3 that uses ATM protocol. In accordance with the convention of this networking configuration, each ATM ADSL modem of ATM access network domains is connected to one ATM access nodes (107-1 or 107-2) of the ATM access network domain (111-5 or 111-6). In addition, each ATM access node (107-1, 107-2) is connected to the respective ATM backbone node (108-1 or 108-2) of ATM backbone network domain 111-9 of ATM wide area network 111-10 (note that there may be additional ATM ADSL modems in the same ATM access network domain connected to the same ATM access node, but these are not shown for simplicity).

Each ATM access network domain (111-5 or 111-6) is equipped with at least one ADSL modem server (130 or 131) and at least one access multimedia bridge server (132 or 133). In addition, ATM backbone network domain 111-9 is equipped with at least one central ATM server 135 and at least one central multimedia bridge server 134. All switched local area network hub-based (102-5, 102-6, 102-7, 102-8, 102-9, 102-10) servers (132 , 130,133, 131, 135, 134) are connected to ATM access or ATM backbone nodes of the ATM wide area network 111-10 using ATM lines (110-9, 110-13, 110-11, 110-7, 110-6, 110-5) via routers (106-3, 106-4, 106-6, 106-8, 106-5).

Still referring to FIGS. 1A and 1B, at location L2, ATM ADSL modem 103-2 is connected to ATM ADSL modem 103-4 of the ATM access network domain 111-6, via ADSL line 109-2, while ATM ADSL modem 103-4 is connected to ATM access node (AAN) 107-2 of ATM access network domain 111-6, of ATM wide area network 111-10, via ATM line 110-12. ATM access node 107-2 is connected to ATM backbone node 108-2 via ATM line 110-8 that uses ATM protocol.

In addition to ADSL modem-based premises networks L1 (170-1) and L2 (170-2), the configuration also permits non-ADSL modem-based premises networks, as illustrated in location L3 (170-3) and location L4 (170-4), each of which do not use ADSL modems or ADSL lines. Rather, in each of these configurations, a non-ADSL modem premises network is connected either directly to an ATM backbone node of the ATM backbone network domain or to an ATM access node of the ATM wide area network. Specifically, for example, MPC 101-3 of non-ADSL modem premises network 170-3 is connected directly to ATM access node 107-1 of ATM access network domain 111-5 using ATM line (non-ADSL line) 110-1 via router 106-1 and switched local area network hub 102-3. Also, MPC 101-4 of non-ADSL modem premises network 170-4 is connected directly to ATM backbone node 108-3 of ATM backbone network domain 111-9 using ATM line (non-ADSL line) 110-2 via router 106-2 and switched local area network hub 102-4. The MPC's (101-3, 101-4) of non-ADSL modem premises networks 170-3 and 170-4, respectively, are also equipped with multimedia conferencing application programs based on H.323 protocol.

ATM backbone network 111-9 is connected to Internet 111-12 via gateway (GW) 106-9, which provides protocol translation between the asynchronous transfer mode (ATM) and the internet protocol (IP). This facilitates the communication between the ATM network and the Internet.

In addition, the public switched telephone network (PSTN) 111-11 is connected to splitters (104-3, 104-4) of ATM ADSL modems (103-3, 103-4) of ATM access network domains (111-5, 111-6). This enables the telephones of the premises networks to communicate directly with the existing PSTN, sharing the existing unshielded twisted pair (UTP) copper wire of the ADSL lines (109-1, 109-2) without changing the existing infrastructure.

Still referring to FIGS. 1A and 1B, a multimedia conference call originating from a ADSL modem-based premises network can interact with both ADSL modem-based premises networks and non-ADSL modem-based premises networks, and vice versa. In the case of ADSL modem-based premises networks, one fundamental contribution of the invention is a scheme described in detail below for sharing the bandwidth of the ADSL access line, for a two-way multimedia conference call, using sophisticated intelligent multimedia ADSL modem control and signaling (AMsig) schemes. In this respect, a unique design of both an MPC-end ADSL modem and an ATM node/switch-end ADSL modem, have been devised to take advantage of the intelligent multimedia signaling schemes. The establishment of the virtual connections to transfer actual multimedia signals over both an ADSL line and the ATM wide area network is another aspect of the invention. In addition, the use of an ADSL modem server and a multimedia bridge server in each ATM access network domain and a central ATM network server and a central multimedia bridge server in the ATM backbone network domain, along with the coordination of functionalities among these servers for initialization of multimedia conference calls using ATM ADSL modem control and signaling (AMsig) protocol schemes, for actual transfer of multimedia signals with guaranteed performance, are additional fundamental aspects of the invention.

Table 1 below, shows the approximate bandwidth characteristics of an asymmetrical digital subscriber line (ADSL) with respect to distance. The table provides an estimate of how much bandwidth can be obtained over a 24-gauge unshielded twisted pair (single pair) copper wire with the use of ADSL modem technology. The table also shows that as much as 1-Mbps digital bandwidth can be used for bi-directional (two-way) communication in both upstream and downstream directions, while the remaining 8-Mbps bandwidth can be used for unidirectional (one-way) downstream communication. The table illustrates the efficient use of the bi-directional bandwidth capacity of an unshielded twisted pair copper wire asymmetrical digital subscriber line (ADSL) for multimedia conferencing.

TABLE 1

Characteristics of Asymmetrical Digital Subscriber Line (ADSL)

| Downstream Bandwidth (Unidirectional) | Upstream/Downstream Bandwidth (Bi-directional) | Distance | Wire Category and Size |
|---|---|---|---|
| 1.536 Mbps | 64 kbps | ~18,000 feet | 24-gauge copper wire (single line consisting of 1-pair wire) |
| 2.048 Mbps | 160 kbps | ~16,000 feet | 24-gauge copper wire (single line consisting of 1-pair wire) |
| 3.072 Mbps | 176 kbps | ~15,000 feet | 24-gauge copper wire (single line consisting of 1-pair wire) |
| 4.096 Mbps | 384 kbps | ~14,000 feet | 24-gauge copper wire (single line consisting of 1-pair wire) |
| 4.608 Mbps | 576 kbps | ~13,000 feet | 24-gauge copper wire (single line consisting of 1-pair wire) |
| 6.144 Mbps | 640 kbps | ~12,000 feet | 24-gauge copper wire (single line consisting of 1-pair wire) |
| ~9 Mbps | ~1 Mbps | ~9,000 feet | 24-gauge copper wire (single line consisting of 1-pair wire) |

Figure 2:
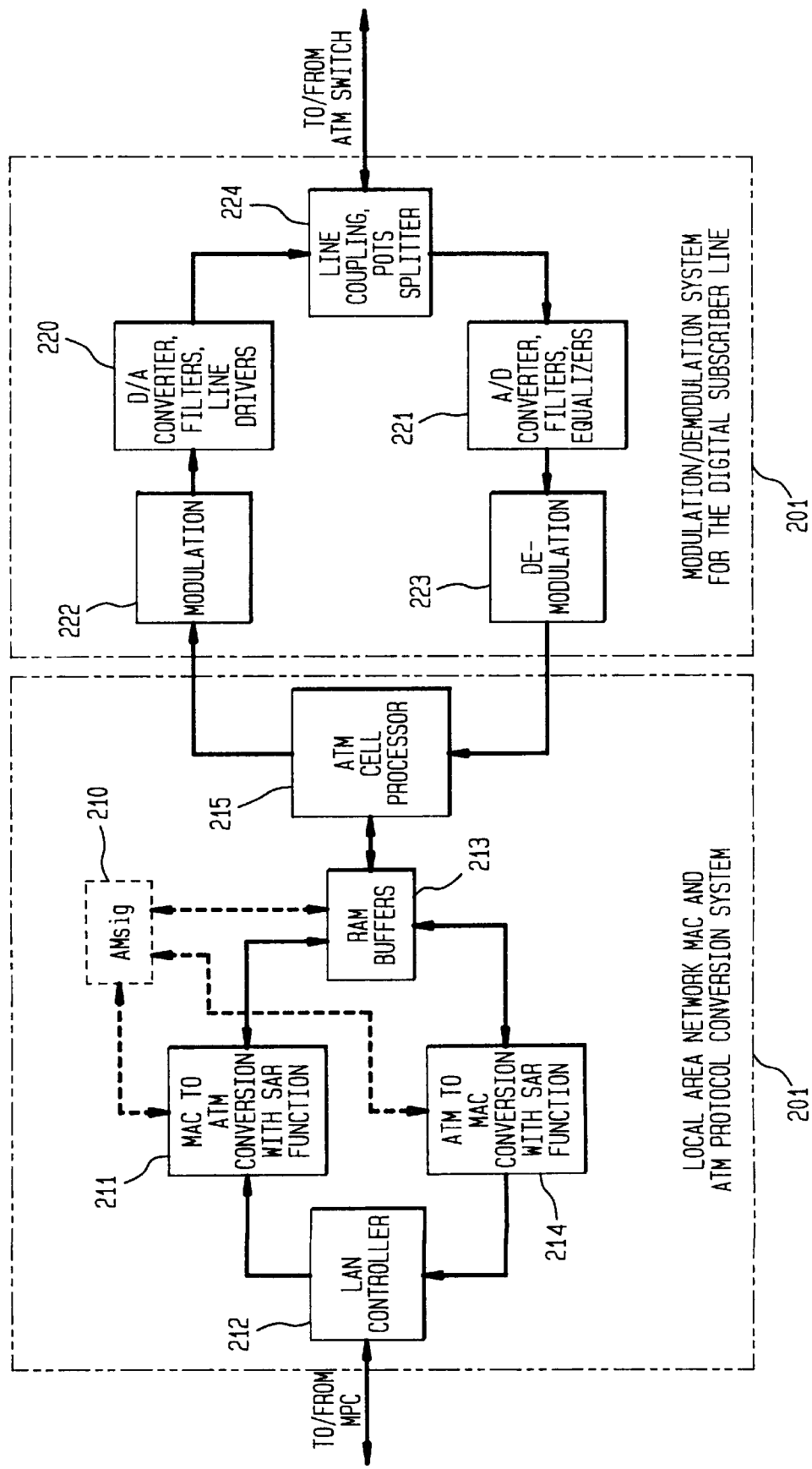
FIG. 2 is a preferred form of component architecture for an ATM ADSL modem, that is connected to a multimedia personal computer/workstation using a LAN interface, in accordance with the inventive concepts.

FIG. 2 shows the component architecture of the ATM ADSL modem to be used within a premises network for an MPC using a LAN interface. There are two functional blocks: local area network medium access (MAC) and ATM protocol conversion system 201 and modulation/demodulation system for the digital subscriber line 202. These two functional entities 201 and 202 are logical, and may be implemented either in a single physical entity or in two separate physical entities. For example, system 201 may be a separate physical entity and many MPC's, connected to different switched local area network hubs (SLHs), can be connected to a single system 201, to provide economies of scale via multiplexing. However, these two distinct logical entities 201 and 202 will act as a single ATM ADSL modem entity of the premises network when all functions are executed in accordance with the scheme described below.

Still referring to FIG. 2, there are six functional entities in the local area network MAC and ATM protocol conversion system 201 of the ATM ADSL modem to be used within premises networks for MPC's using a LAN interface: local area network controller 212, medium access control (MAC) to ATM protocol conversion with segmentation and reassembly (SAR) function 211, ATM to medium access control (MAC) conversion with SAR function 214, random access memory (RAM) buffers 213, ATM cell processor 215, and an ADSL control and signaling (AMsig) 210 entity. In LAN controller 212, the traffic coming in and out of an MPC, via a LAN, is controlled. If the traffic comes from the MPC to the ATM ADSL modem, the LAN controller directs it to the functional entity 211 where medium access control (MAC) protocol of the local area network (LAN) is converted to the asynchronous transfer mode (ATM) protocol along with SAR function (as defined in the ATM Forum standard, such as LAN emulation (LANE) protocol schemes). If traffic comes from the functional entity 214 to the LAN controller 212, the LAN controller 212 sends the traffic to the MPC via the LAN. The functional entity 214 converts the asynchronous transfer mode (ATM) protocol along with SAR function for traffic coming from the RAM buffers 213 to the medium access control (MAC) protocol of the local area network (LAN) (as defined in the ATM Forum standard, such as LAN emulation (LANE) protocol schemes). The communication between the functional entities (211, 214), and random access buffers 213, is in full duplex mode, from a control and signaling communication point of view.

If traffic comes from an MPC to ATM wide network 111-10, RAM buffers 213 store the traffic received from the functional entity 211 as ATM cells (defined in accordance with the ATM Forum standard) and then transfer the ATM cells to the ATM cell processor 215, as indicated by the AMsig 210 entity. If traffic comes from the ATM wide network to the MPC, RAM buffers 213 store the traffic received from ATM cell processor 215 as ATM cells (defined in accordance with the ATM Forum standard) and then transfer the ATM cells to the functional entity 214, as indicated by the AMsig 210 entity. ATM cell processor 215 handles the ATM cells to and from RAM buffers 213 and transfers cells to the modulation entity 222 for modulation of the digital signals and receives cells from the demodulation entity 223 after demodulation of the digital signals (in accordance with ADSL Forum and T1E1.4 standards).

The modulation/demodulation system for the digital subscriber line unit 202 has five functional entities in accordance with the ADSL Forum and T1E1.5 standards: modulation 222, demodulation 223, digital to analog conversion, filters, and line drivers 220, analog to digital conversion, filters, and equalizers 221, and line coupling and POTS splitter 224. Modulation entity 222 modulates ATM cells received from ATM cell processor 215 (in accordance with the scheme specified in the ADSL Forum and T1E1.4 standards), while the digital to analog converter, filters, and line drivers 220 perform the conversion of the digital signal into appropriate analog form (as specified in the ADSL Forum and T1E1.4 standards). The analog to digital converter, filters, and equalizers 221 convert the analog signal received from ATM wide area network 111-10 via the ADSL line (109-1, 109-2) in digital bit streams (as specified in the ADSL Forum and T1E1.4 standards), while the demodulation entity 223 demodulates the digital signal and recovers the ATM cells (as specified in the ADSL Forum and T1E1.4 standards) and sends the recovered ATM cells to the ATM cell processor 215 for further processing. The line coupling functional entity 224 sends the analog signals from the digital to analog entity 220 to the ATM wide area network, via the ADSL line, or receives the analog signals from the ATM wide area network, via the ADSL line, for sending to the analog to digital converter functional entity 221 (in accordance with the ADSL Forum and T1E1.4 standards). The POTS splitter is used to split the telephone signal from the ADSL line for separate voice communication as to be specified (in accordance with the ADSL Forum and T1E1.4 standards).

Figure 3:
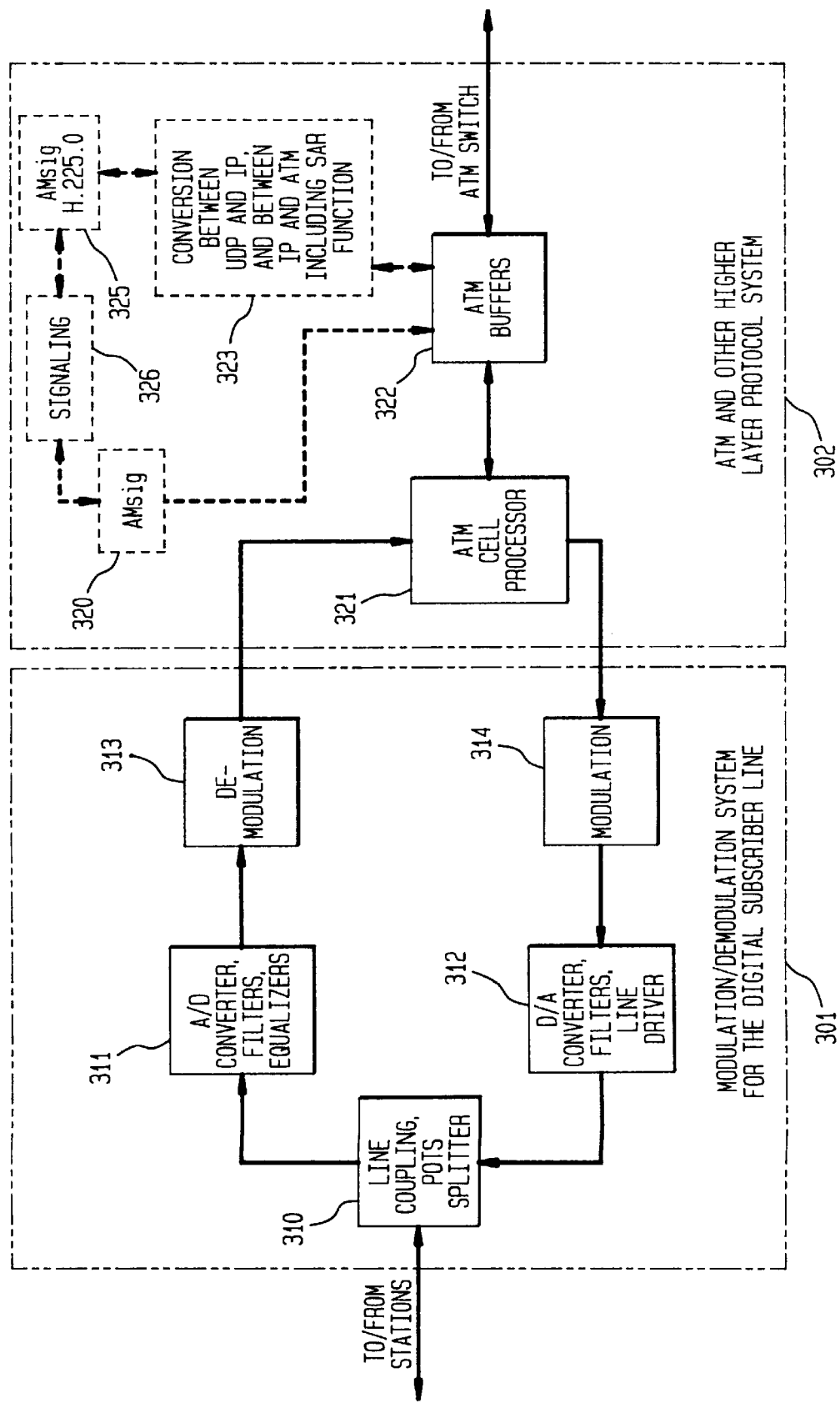
FIG. 3 is a preferred form of component architecture for an ATM ADSL modem, that is connected to an ATM switch/node of the ATM network, in accordance with the inventive concepts.

FIG. 3 illustrates the component architecture of an ATM ADSL modem to be used for connection to the ATM network. There are two functional blocks: modulation/demodulation system for the digital subscriber line 301, and ATM and other higher layer protocol system 302. These two functional entities 301 and 302 are logical, and can be implemented either in a single physical entity or in two separate physical entities. For example, a single ATM and other higher layer protocol system 302 unit, connected to an ATM node/switch, can be made a separate physical entity where a plurality of modulation/demodulation system 301 units can be connected, to provide economies of scale via multiplexing. Similarly, a single modulation/demodulation system for the ATM ADSL 301 unit can be connected to a plurality of ATM ADSL modems (shown in FIG. 2) of premises networks, again to provide economies of scale via multiplexing. However, these two distinct logical entities 301 and 302 will act as a single ATM ADSL modem entity where all functions are executed in accordance with the scheme described below.

Moreover, a single network ATM ADSL modem containing both functional entities, modulation/demodulation system for the digital subscriber line unit 301, and ATM and other higher layer protocol system 302, of a given ATM node/switch can also be connected to a plurality of ATM ADSL modems (shown in FIG. 2) of premises networks to provide economics of scale via multiplexing.

More particularly, the modulation/demodulation system for the digital subscriber line unit 301 has five functional entities (in accordance with the ADSL Forum and T1E1.4 standards): line coupling and POTS splitter 310, analog to digital conversion, filters, and equalizers 311, digital to analog conversion, filters, and line drivers 312, demodulation 313, and modulation 314. The line coupling functional entity 310 sends the analog signals from the digital to analog entity 312, over the ADSL line, to the customer premises network, and, also sends the analog signals coming over the ADSL line, from the customer premises network, to the analog to digital converter functional entity 311, for conversion of the analog signal into digital bit streams (both in accordance with the ADSL Forum and T1E1.4 standards). As previously noted, the POTS splitter is used to split the telephone signal from the ADSL line for separate voice communication (as to be specified in accordance with the ADSL Forum and T1E1.4 standards). The analog to digital converter, filters, and equalizers 311 converts the analog signal received from the customer premises, via the ADSL line (109-1, 109-2), in digital bit streams, while the demodulation 313 functional entity demodulates the digital signal (both as specified in the ADSL Forum and T1E1.4 standards) and sends the digital bit streams to the ATM cell processor 321 to recover the ATM cells. The digital to analog converter, filters, and line drivers 312 perform the conversion of the digital signal into appropriate analog form, while the modulation entity 314 modulates the digital ATM cells received from the ATM cell processor 321 and sends the modulated digital signals to the digital to analog converter functional entity 312 for conversion of digital signals into analog form (again, both as specified in the ADSL Forum and T1E1.4 standards).

The ATM and higher layer protocol functional entity 302 contains six functional entities: ATM cell processor 321, ATM buffers 322, AMsig 320, H.225.0/AMsig 325, signaling 326, and conversion between user data protocol (UDP) and internet protocol (IP), and between IP and ATM including segmentation and reassembly (SAR) function 323. ATM cell processor 321 receives the recovered digital bit stream from the demodulation entity 313 and recovers the ATM cells from the digital bit streams for storing to the ATM buffers 322 with instruction from the AMsig control and signaling protocol scheme in accordance with the invention. ATM cell processor 321 transfers the ATM cells from the ATM buffers to the modulation entity 314, for transferring the traffic coming from the ATM network to the premises networks, with instruction from the AMsig control and signaling protocol scheme in accordance with the invention.

Functional entity 323 provides conversion between the user data protocol (UDP) and the internet protocol (IP), and between internet protocol (IP) and asynchronous transfer mode (ATM) protocol along with SAR function (as defined in the IETF and ATM Forum standards). If the traffic comes from the premises network for transferring over the ATM network 111-10 and the conversion between the UDP/IP and ATM protocol is needed, the ATM cell processor 321 sends the traffic to the protocol conversion entity 323, via the ATM buffers 322, and the protocol conversion entity 323 communicates with H.225.0/AMsig 325 entity as needed based on the AMsig control and signaling scheme of the invention. If it is needed, the signaling entity 326 will send the H.225.0/AMsig 325 AMsig control and signaling protocol messages to the protocol conversion entity 323 encapsulating the messages into user data protocol (UDP). The protocol conversion entity 323 then converts the user data protocol (UDP) into internet protocol (IP) and then encapsulates the IP over the asynchronous transfer mode (ATM) protocol including SAR function (in accordance with the Internet Engineering Task Force (IETF) and ATM Forum standards). The ATM cells are then transferred to ATM buffers 322 for sending over the ATM switch/node of the ATM network 111-10.

Similarly, reverse processes take place if the protocol conversion services are needed for the traffic that is sent from the ATM switch/node of the ATM network 111-10 to premises networks. The ATM buffers 322 receive and transfer ATM cells in full-duplex mode to and from the ATM wide area network 111-10, ATM cell processor, and protocol conversion entity 323 in accordance with the control and signaling schemes of AMsig 320, AMsig/H.225.0 325, and signaling entity 326 in accordance with the invention.

Still referring to FIG. 3, the AMsig 320 functional entity executes the control and signaling scheme for initialization of the multimedia conference call and establishment of virtual connections for transferring of actual multimedia traffic over the ATM ADSL access network consisting of the ADSL lines and the ATM network 111-10 in accordance with the invention. Table 2 provides a preferred form of AMsig control and signaling protocol messages that will be used in accordance with this aspect of the invention.

TABLE 2

AMsig Control and Signaling Protocol Messages

| Control and Signaling messages | Description |
| --- | --- |
| AM-ARQ | admission request message for the hybrid networking environment that contains ADSL access network and the ATM network |
| AM-ACF | confirmation of the admission request message for the hybrid networking environment that contains ADSL access network and the ATM network |
| AM-ARJ | rejection of the admission request message for the hybrid networking environment that contains ADSL access network and the ATM network |
| AM-setup | setup request for the virtual connection over the ADSL access network having ATM ADSL modem |
| AM-connect | connection request for the virtual connection over the ADSL access network having ATM ADSL modem |
| AM-call-proceeding | connection request for the virtual connection over the ADSL access network having ATM ADSL modem is proceeding |
| AM-call-reject | connection request for the virtual connection over the ADSL access network having ATM ADSL modem is proceeding is rejected |
| AM-call-alerting | alert message for the connection request for the virtual connection over the ADSL access network having ATM ADSL modem |

Referring back to FIG. 3, the H.225.0/AMsig entity 325 provides a hybrid mixture of H.225.0 control and signaling messages (of the ITU-T's H.323 protocol standard) and the AMsig control and signaling protocol messages (in accordance with the invention). The signaling entity 326 provides inter-signaling communication between AMsig 320 and H.225.0/AMsig 325, with possible conversion of the control and signaling messages between AMsig and H.225.0 control and signaling messages when necessary. The signaling entity 326 acts as a signaling protocol conversion entity. The functional entity 323 provides conversion between the user data protocol (UDP) and the internet protocol (IP) and between internet protocol (IP) and asynchronous transfer mode (ATM) protocol along with SAR function. If traffic comes from the premises networks, over the ADSL lines, going to the ATM network 111-10, and the conversion between the UDP/IP and ATM protocol is needed, ATM cell processor 321 sends the traffic to protocol conversion entity 323, via ATM buffers 321, and conversion entity 323 communicates with H.225.0/AMsig 323 as needed based on the AMsig control and signaling scheme of the invention. If it is necessary, the H.225.0/AMsig 325 will send AMsig control and signaling protocol messages to protocol conversion entity 323 encapsulating the messages into user data protocol (UDP). Protocol conversion entity 323 converts the user data protocol (UDP) into internet protocol (IP) and then encapsulates the IP over the asynchronous transfer mode (ATM) protocol including SAR function (in accordance with the Internet Engineering Task Force (IETF) and ATM Forum standards), and the ATM cells are then transferred to ATM buffers 322 for sending over the ATM switch/node of the ATM network 111-10. Similarly, reverse processes take place if protocol conversion services are needed for traffic that is sent from an ATM switch/node of the ATM network 111-10, to premises networks, over the ATM ADSL access network.

Figure 4:
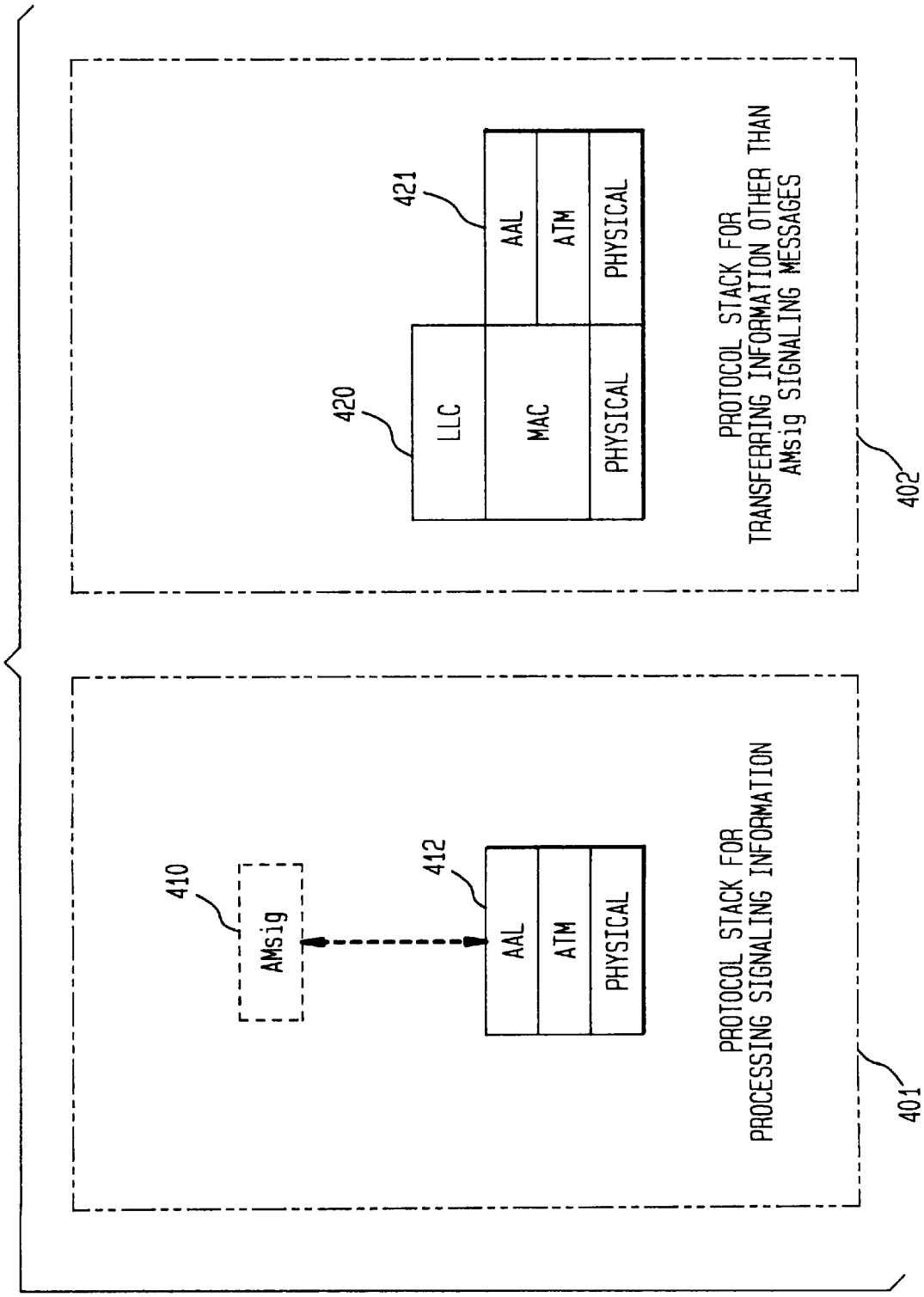
FIG. 4 shows a preferred form of protocol architecture for an ATM ADSL modem, that is connected to the multimedia personal computer/workstation using a LAN interface, in accordance with the inventive concepts.

FIG. 4 illustrates the protocol stacks of an ATM ADSL modem of a premises network. Protocol stack 401 is used when AMsig control and signaling protocol messages are transferred, while protocol stack 402 is used when actual information, other than AMsig control and signaling protocol messages, are transferred over the ATM ADSL modem. AMsig messages are terminated to the ATM ADSL modem of the premises network and are not transferred to the MPC. In protocol entity 401, AMsig control and signaling protocol messages are encapsulated over the ATM adaptation layer (AAL) protocol using SAR function and ATM cells (in accordance with the ATM Forum standard). In protocol entity 402, there are two separate protocol stacks: logical link control (LLC), medium access control (MAC), and physical layer, 420, and ATM adaptation layer (AAL), asynchronous transfer mode (ATM) protocol, and physical layer, 421. Protocol entity 420 (LLC, MAC) is used for communication between the ATM ADSL modem and the MPC of the premises network, via the local area network interface, while protocol entity 421 (AAL, ATM) is used for communication between the ATM ADSL modem (103-1, 103-2) of the premises network (170-1, 170-2), and the ATM ADSL modem (103-3, 103-4) of the ATM node/switch (107-1, 107-2), via ADSL line (109-1, 109-2).

Figure 5:
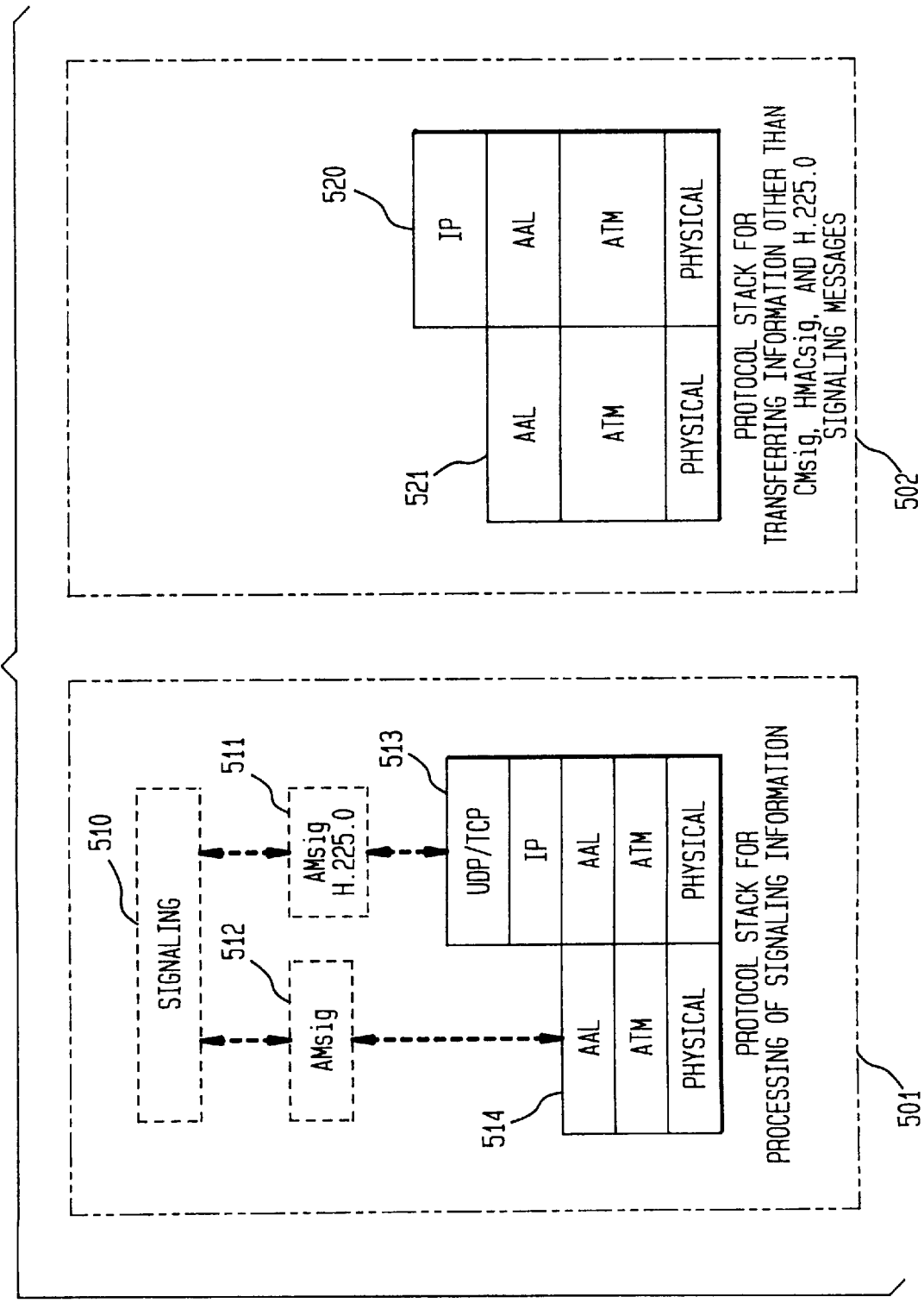
FIG. 5 shows a preferred form of protocol architecture for an ATM ADSL modem, that is connected to an ATM node/switch of the ATM network, in accordance with the inventive concepts.

In FIG. 5, the protocol stacks of the ATM ADSL modem (103-3, 103-4) connected to the ATM node/switch (107-1, 107-2) are shown. Protocol stack 501 is used when AMsig control and signaling protocol messages (in accordance with the invention), and H.225.0 control and signaling messages of the ITU-T H.323 protocol standards, are transferred, while protocol stack 502 is used when actual information, other than H.225.0 control and signaling protocol messages of the ITU-T H.323 protocol standards and AMsig control and signaling messages, are transferred over the ATM ADSL modem (103-3, 103-4) connected to the ATM node/switch (107-1, 107-2). In protocol entity 501, AMsig 512 control and signaling protocol messages are used over the protocol entity 514 (AAL, ATM) between the ATM ADSL modem of the premises network, and the ATM ADSL modem (103-3, 103-4) connected to the ATM node/switch (107-1, 107-2), to implement the AMsig control and signaling protocol in accordance with the invention for communication over the ATM ADSL access network consisting of the ADSL line. In addition, H.225.0/AMsig 511 control and signaling protocol messages are used on end-to-end basis over the protocol entity 513 (user data protocol [UDP]/transmission control protocol [TCP], IP, AAL, ATM). However, signaling entity 510 is an intelligent mechanism that has been devised in accordance with the invention for any inter-signaling communication between the AMsig control and signaling protocol scheme of the invention and H.225.0 of the ITU-T H.323 protocol standards.

Still referring to FIG. 5, protocol entity 502 is used for transferring information between the ATM ADSL modem of the premises network, and the ATM node/switch (107-1, 107-2), over the ATM ADSL access network consisting of the ADSL line (109-1, 109-2), as well as over the ATM network 111-10, for transferring information other than the AMsig and H.225.0 control and signaling information. Specifically, protocol entity 521 (AAL, ATM) is used for transferring information between the ATM ADSL modem of the premises network and the ATM node/switch (107-1, 107-2), while protocol entity 520 (IP, AAL, ATM) is used for transferring information between the ATM ADSL modem of the ATM node/switch (107-1, 107-2) and the ATM network 111-10.

Figure 6:
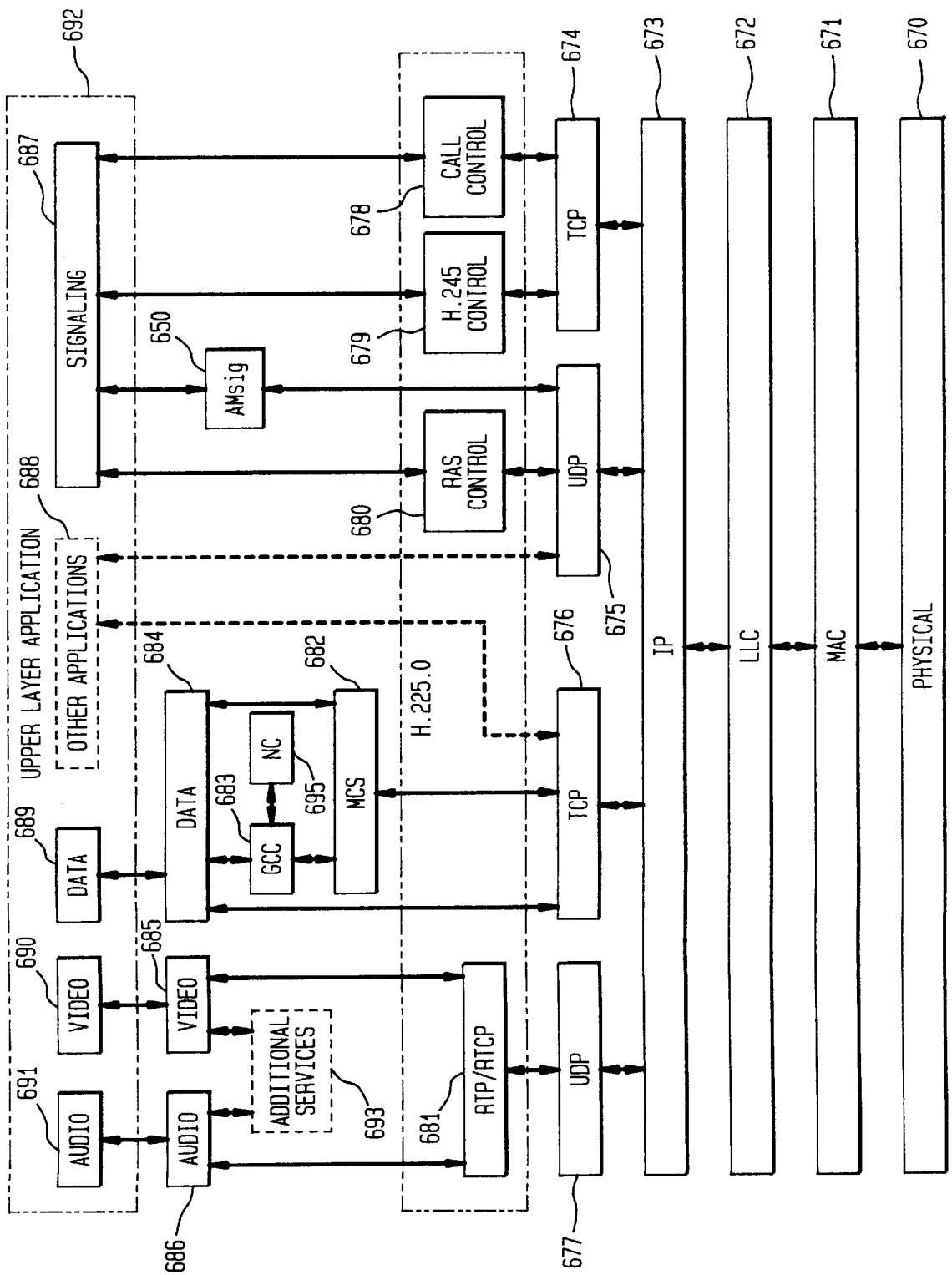
FIG. 6 shows a preferred form of protocol architecture for a multimedia personal computer/workstation that uses ATM ADSL modem control and signaling protocol schemes in accordance with the inventive concepts.

FIG. 6 shows the protocol architecture of an MPC (101-1 or 101-2 of FIG. 1) of an ATM ADSL modem-based premises networks. The LAN-based computer uses H.323 protocol and is augmented with AMsig 650 control and signaling protocol to adapt with circumstances for taking advantage of the ATM ADSL access network consisting of the ADSL line (109-1, 109-2).

Figure 7:
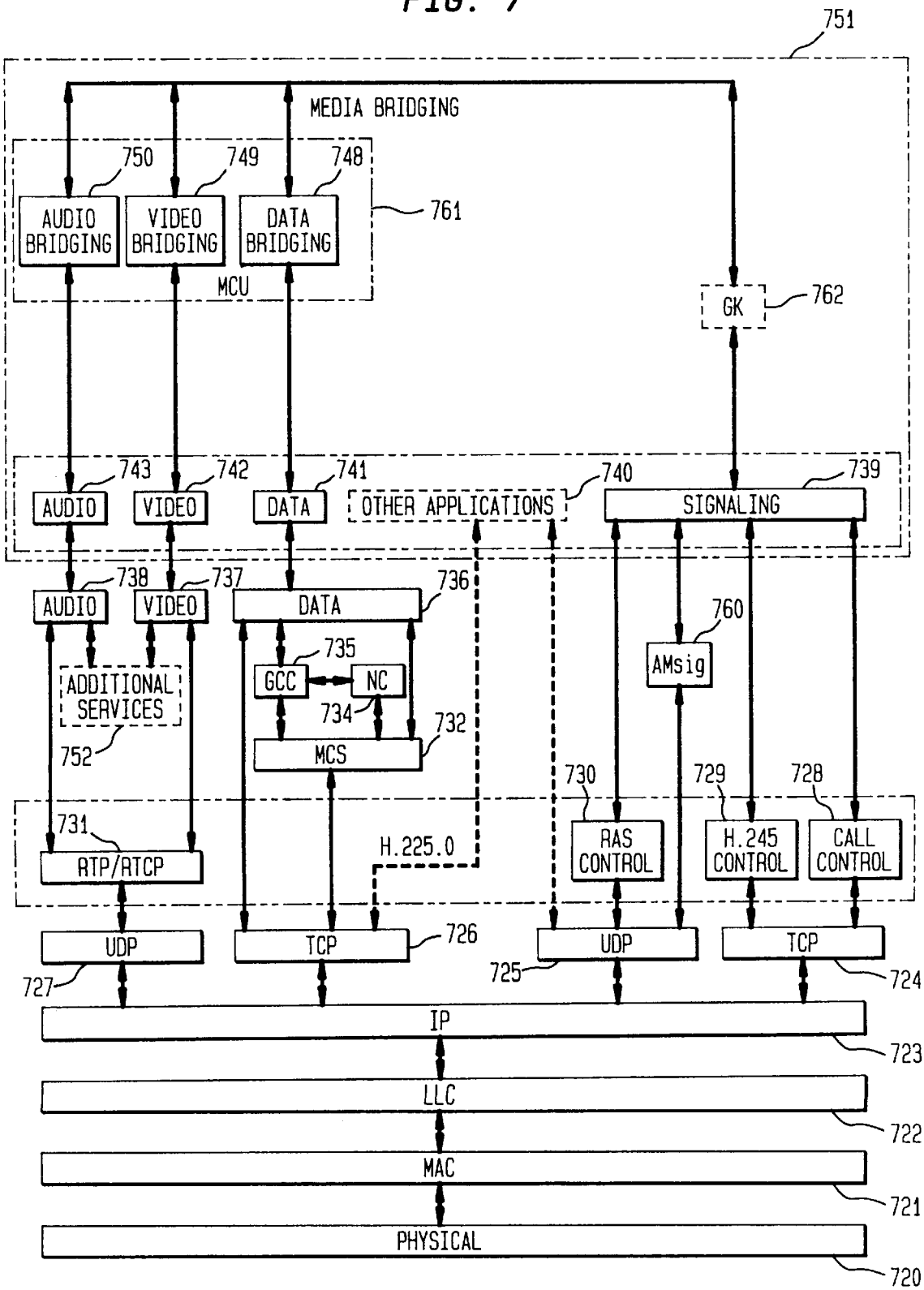
FIG. 7 shows a preferred form of protocol architecture for a switched local area network hub (SLH)-based (access or central) multimedia bridge server that uses ATM ADSL modem control and signaling protocol schemes in accordance with the inventive concepts.

In FIG. 7, the protocol architecture of an access (132, 133) or central (134) multimedia bridge server is shown. The protocol architecture of this server is based on H.323 protocol that contains multipoint control unit (MCU), gatekeeper (GK), in addition to other, functionalities. Multimedia bridge servers (132, 133, and 134) are augmented with AMsig 760 control and signaling protocol schemes to take advantage of the ATM ADSL access network consisting of the ADSL line (109-1, 109-2).

Figure 8:
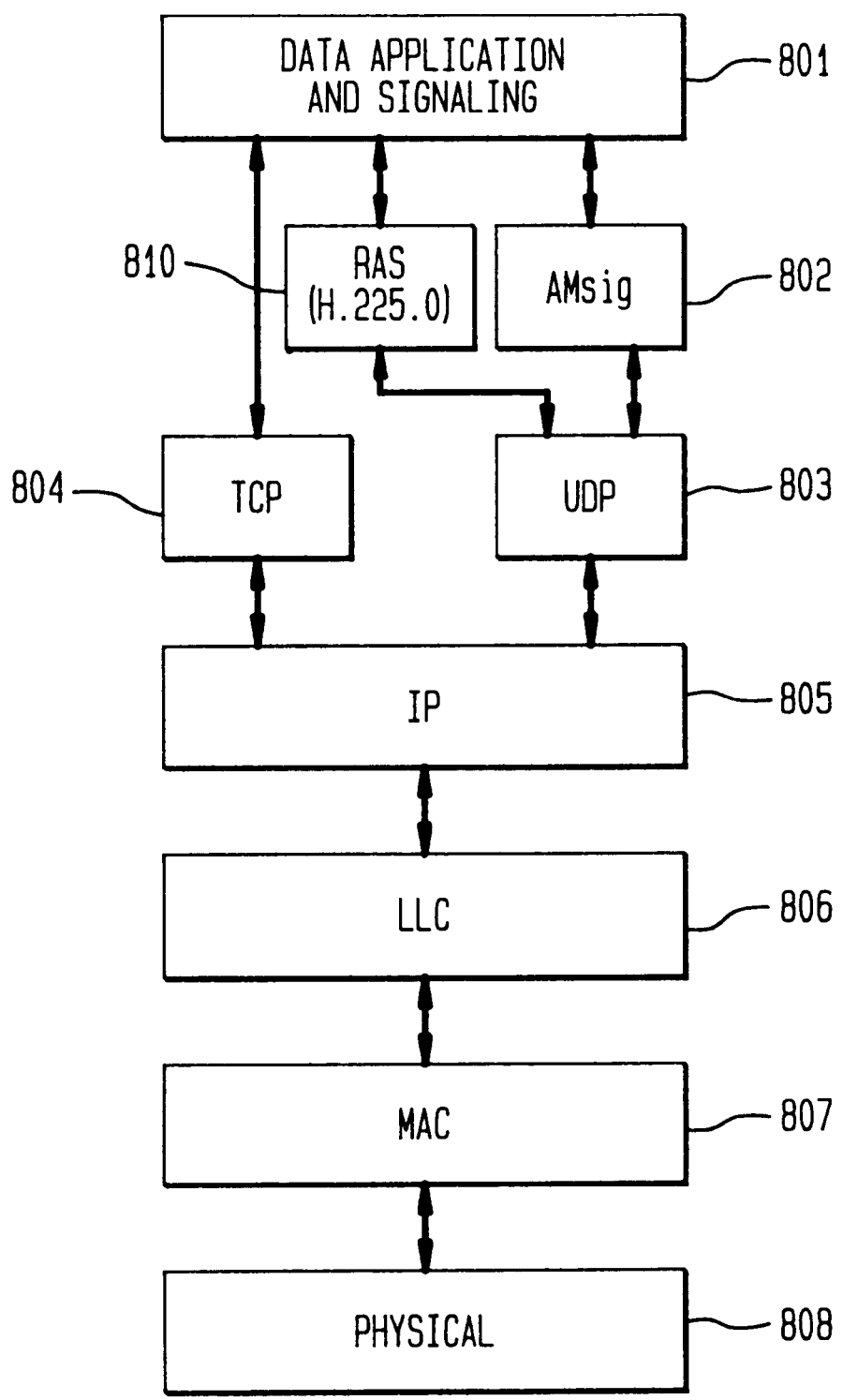
FIG. 8 shows a preferred form of protocol architecture for a switched local area network hub (SLH)-based ADSL modem server (or central ATM network server) that uses ATM ADSL modem control and signaling schemes in accordance with the inventive concepts.

FIG. 8 illustrates the protocol architecture for an ADSL modem server (130, 131) or a central ATM network server 135. The protocol architecture consists of a data application and signaling layer 801, AMsig 802, registration, administration, and status (RAS) 810 of ITU-T H.323 (H.225.0), transmission control protocol (TCP) 804, user data protocol (UDP) 803, internet protocol (IP) 805, logical link control (LLC) 806, and medium access control (MAC) 807. All protocols are based on standards, except the AMsig 802 control and signaling protocol scheme. All servers (130, 131, 135) are augmented with the AMsig 802 control and signaling protocol to meet the special requirements for communication in this hybrid communication environment for taking the advantage of the ATM ADSL access network consisting of the ADSL line (109-1, 109-2). Table 3, below, depicts a preferred form of a bandwidth table that is maintained by each ADSL modem server for the networking scheme.

TABLE 3

Bandwidth Table of the ADSL Modem Server

| Premises networks connected to the ATM ADSL modem of the ATM node/switch | Upstream and downstream capacity of the ADSL line | Devices within a given Premises Network | Upstream Bandwidth for each Application of a given Device | Downstream Bandwidth for each Application of a given Device |
|---|---|---|---|---|
| Premises Network 1 | ADSL Line 1: Upstream bandwidth 1 Downstream bandwidth 1 | Device 1 | Upstream bandwidth 1 | Downstream bandwidth 1 |
| | | | Upstream bandwidth N | Downstream bandwidth N |
| | | Device M | Upstream bandwidth 1 | Downstream bandwidth 1 |
| | | | Upstream bandwidth K | Downstream bandwidth K |
| | | Premises Network Device 1 W | Upstream bandwidth 1 | Downstream bandwidth 1 |
| | | | Upstream bandwidth X | Downstream bandwidth X |
| | | Device Y | Upstream bandwidth 1 | Downstream bandwidth 1 |
| | | | Upstream bandwidth Z | Downstream bandwidth Z |
| Premises Network L | ADSL Line L: Upstream Bandwidth L Downstream bandwidth L | Device 1 | Upstream bandwidth 1 | Downstream bandwidth 1 |

TABLE 3-continued

Bandwidth Table of the ADSL Modem Server

| Premises networks connected to the ATM ADSL modem of the ATM node/switch | Upstream and downstream capacity of the ADSL line | Devices within a given Premises Network | Upstream Bandwidth for each Application of a given Device | Downstream Bandwidth for each Application of a given Device |
|---|---|---|---|---|
| | | | — | — |
| | | | Upstream bandwidth P | Downstream bandwidth P |
| | | Device M | Upstream bandwidth 1 | Downstream bandwidth 1 |
| | | | — | — |
| | | | Upstream bandwidth K | Downstream bandwidth K |
| | | | — | — |
| | | | Upstream bandwidth S | Downstream bandwidth S |

Figure 9:
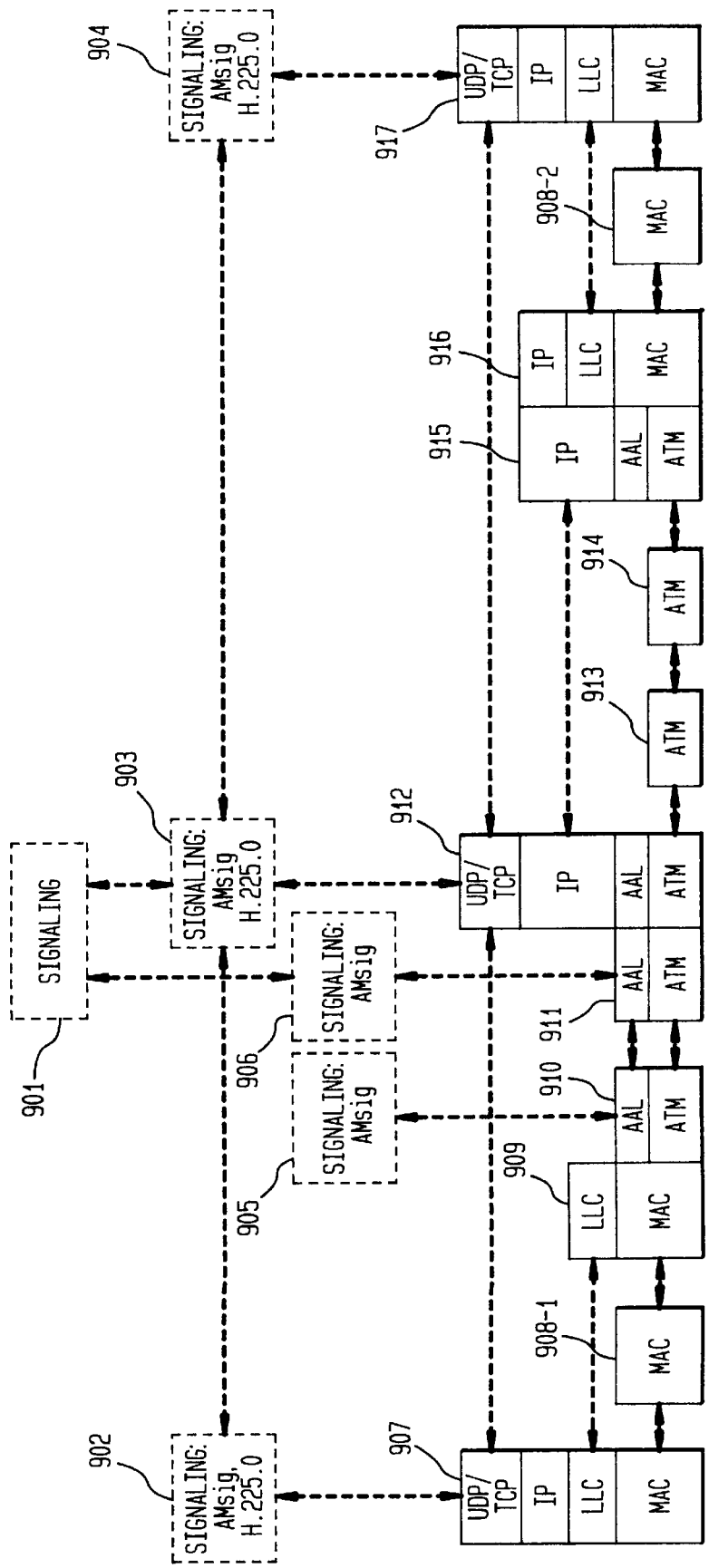
FIG. 9 depicts a preferred form of high-level end-to-end protocol architecture for communication (for control or signaling only) between a multimedia personal computer/workstation and an ADSL modem access server (access multimedia server, central multimedia bridge server, or central server) in accordance with the inventive concepts.

In FIG. 9, protocol architecture for end-to-end communications for transferring control and signaling messages (AMsig, H.225.0) between MPC's (101-1, 101-2, 101-3, or 101-4), ATM ADSL modems of premises networks and ATM switches, and ATM network-based servers (ADSL modem servers [130, 131], access multimedia bridge servers [132, 133], central network server 136, central multimedia bridge server 134) via switched local area network hub (102-1, 102-2, 102-3, 102-5, 102-6, 102-7, 102-8, 102-9, or 102-10), ATM nodes/switches (107-1, 107-2, 108-1, 108-2, 108-3), and ATM routers (106-1, 106-2, 106-3, 106-4, 106-5, 106-6, 106-7, 106-8) of the ATM wide area network 111-10, is explained. Protocol stack 907, running on MPC 101-1, 101-2, 101-3, or 101-4, has H.323 standard-based entities (together with AMsig and H.225.0 control and signaling protocol 902 schemes); (note that other architectural entities, such as generic conference control (GCC), node controller (NC), and multipoint communications service (MCS) (of H.323 standard) have not been shown for simplicity). The protocols UDP/TCP and IP are used for encapsulation of control and signaling messages in accordance with IETF standards, while LLC and MAC protocols are used for communication over the local area network in accordance with IEEE standards. Similarly, protocol stack 908-1 (and 908-2) runs over the switched local area network hub (102-1, 102-2, 102-3, 102-5, 102-6, 102-7, 102-8, 102-9, or 102-10) in accordance with IEEE standards.

Still referring to FIG. 9, networking protocol stacks 909 and 910, and signaling (AMsig) protocol 905, run on the ATM ADSL modem of the premises network. Protocol stack 909 of the ATM ADSL modem is used for communication with the MPC via the switched local area network, while protocol stacks 905 and 910 are used for communication with the ATM ADSL modem of the ATM node/switch via the ATM ADSL access network consisting of the ADSL line.

Signaling protocol stacks (901, 906 and 903) and transport and networking protocol stacks (912 and 911) are used in the ATM ADSL modem of the ATM node/switch and are used for communication with the ATM ADSL modem of the premises network via the ATM ADSL access network consisting of the ADSL line. However, signaling protocols 901 and 903 (AMsig, H.225.0) and transport and networking protocols 912 (UDP/TCP, IP, AAL, ATM) are used for communication with the ATM network-based servers (130, 131, 132, 133, 135) via the ATM wide area network 111-10. The signaling entity 901 facilitates communication for inter-signaling communications between AMsig and AMsig/H.225.0 in accordance with the invention.

ATM protocol entity (913 and 914) is used in the ATM node/switch in accordance with the ATM Forum standards. The protocol entities 915 (IP, AAL, ATM) and 916 (IP, LLC, MAC) are used in ATM routers (106-3, 106-4, 106-5, 106-6, 106-7, 106-8) that connect the switched local area network hub-based server to the ATM network 111-10, while protocol entity 908-1 or 908-2 (MAC) is used in the switched local area network hub (102-1, 102-2, 102-3, 102-5, 102-6, 102-7, 102-8, 102-9, or 102-10) in accordance with IEEE standards. The signaling protocol 904 (AMsig, H.225.0) and the transport and networking protocols (UDP/TCP, IP, LLC, MAC) are used in the ATM network-based servers (130, 131, 132, 133, 134, 135).

Figure 10:
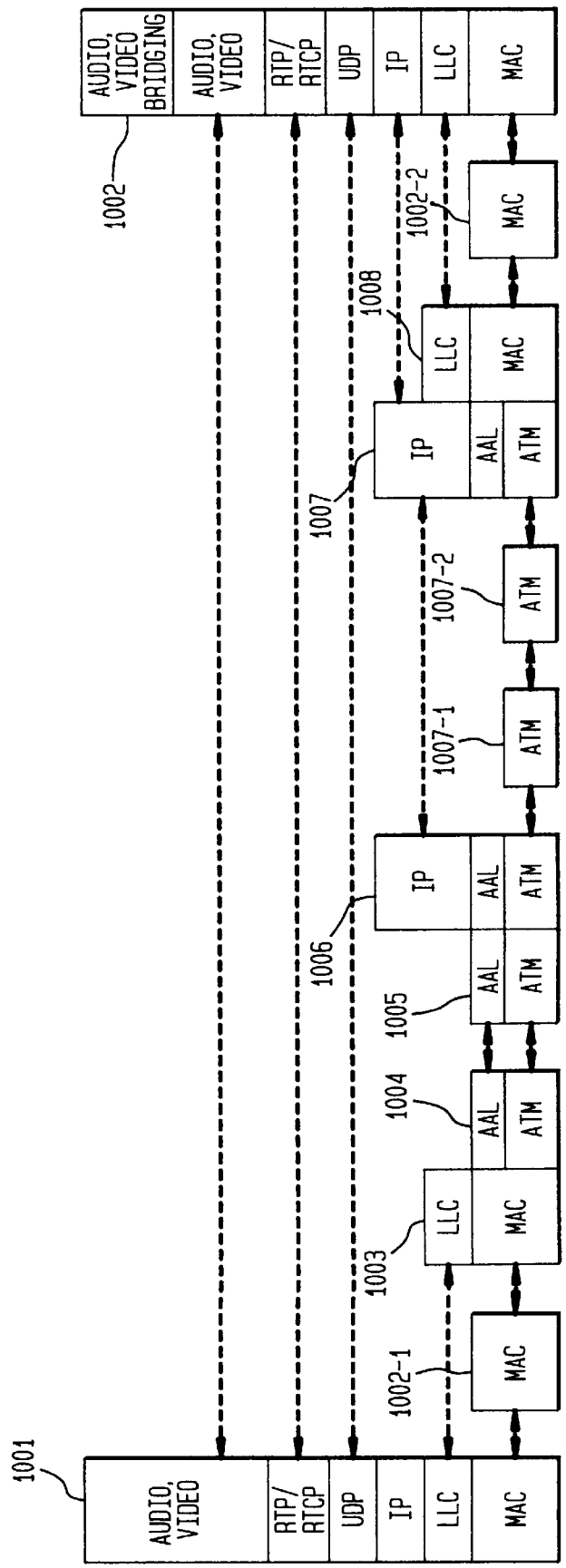
FIG. 10 shows a preferred form of high-level end-to-end protocol architecture for communication (for audio or video only) between a multimedia personal computers/workstation and an access multimedia bridge server (or central multimedia bridge server) in accordance with the inventive concepts.

In FIG. 10, the protocol architecture for end-to-end communications for transferring audio and video signals between the MPC's (101-1, 101-2, 101-3, or 101-4) and the access or central multimedia bridge servers (132, 133, or 134) via ATM ADSL modems of premises networks and ATM nodes/switches, switched local area network hub (102-1, 102-2, 102-3, 102-4, 102-5, 102-6, 102-7, 102-8, 102-9, 102-10), ATM nodes/switches (107-1, 107-2, 108-1, 108-2, 108-3), and ATM routers (106-1, 106-2, 106-3, 106-4, 106-5, 106-6, 106-7, 106-8) of the ATM wide area network 111-10 is explained. The protocol entities 1001 (audio, video, RTP/RTCP, UDP, IP, LLC, MAC), 1002-1/1002-2 (MAC), 1003 (LLC, MAC)/1004 (AAL, ATM), 1005 (AAL, ATM)/1006 (IP, AAL, ATM), 1007-1 (ATM)/1007-2 (ATM), 1007 (IP, AAL, ATM)/1008 (LLC, MAC), and 1002 (audio/video bridging, audio, video, RTP/RTCP, UDP, IP, LLC, MAC) are used by the MPC, switched local area network hubs, ATM ADSL modem of the premises network, ATM ADSL modem of the ATM switch/node, ATM router, and multimedia bridge server, respectively, in accordance with ITU-T, IETF, IEEE, and ATM Forum standards (as applicable).

Figure 11:
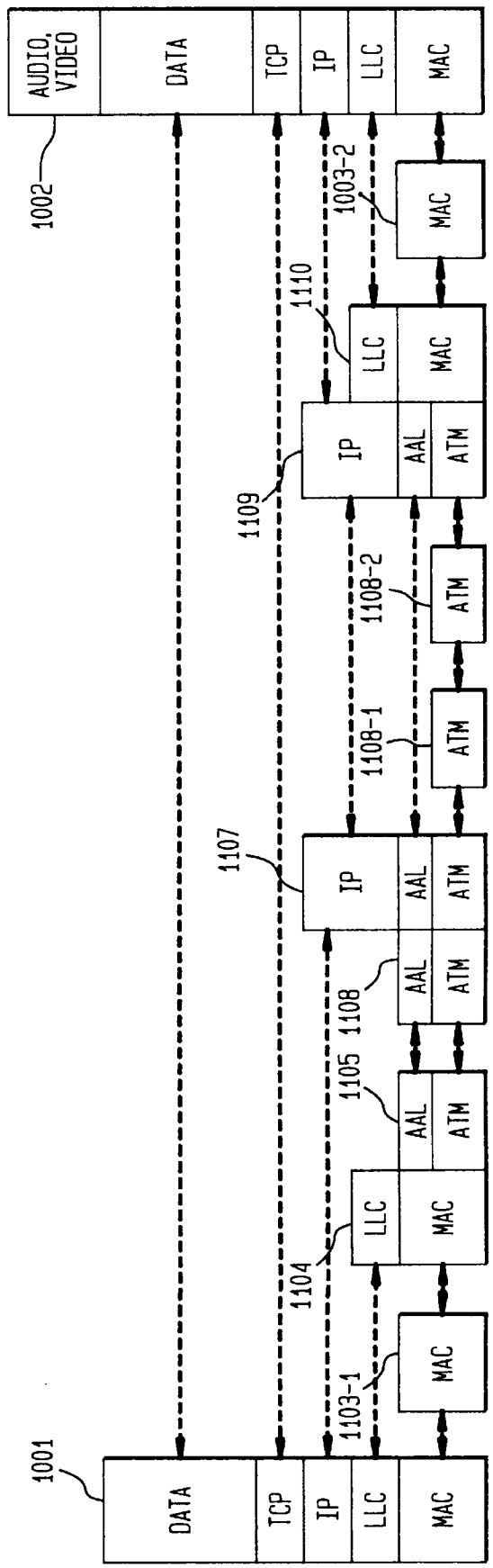
FIG. 11 shows a preferred form of high-level end-to-end protocol architecture for communication (for data other than control and signaling traffic) between a multimedia personal computer/workstation and a multimedia bridge server (or central multimedia bridge server) in accordance with the inventive concepts.

Finally, in FIG. 11, the protocol architecture for end-to-end communications for transferring of data signals between the MPC (101-1, 101-2, 101-3, or 101-4) and the access or central multimedia bridge server (132, 133, or 134) via ATM ADSL modems of premises networks and ATM nodes/switches, switched local area network hub (102-1, 102-2, 102-3, 102-5, 102-6, 102-7, 102-8, 102-9, or 102-10), nodes/switches (107-1, 107-2, 108-1, 108-2, 108-3), and ATM routers (106-1, 106-2, 106-3, 106-4, 106-5, 106-6, 106-7, 106-8) of the ATM wide area network 111-10 is explained. The protocol entities 1101 (data, TCP, IP, LLC, MAC), 1103-1/1103-2 (MAC), 1104 (LLC, MAC)/1105 (AAL, ATM), 1106 (AAL, ATM)/1107 (IP, AAL, ATM), 1108-1 (ATM)/1108-2 (ATM), 1109 (IP, AAL, ATM)/1110 (LLC, MAC), and 1102 (data bridging, data, TCP, IP, LLC, MAC) are used by the MPC, switched local area network hub, ATM ADSL modem of the premises network, ATM ADSL modem of the ATM node/switch, ATM switch/node, ATM router, and multimedia bridge server, respectively, in accordance with ITU-T, IETF, IEEE, and ATM Forum standards (again, as applicable).

Figure 12:
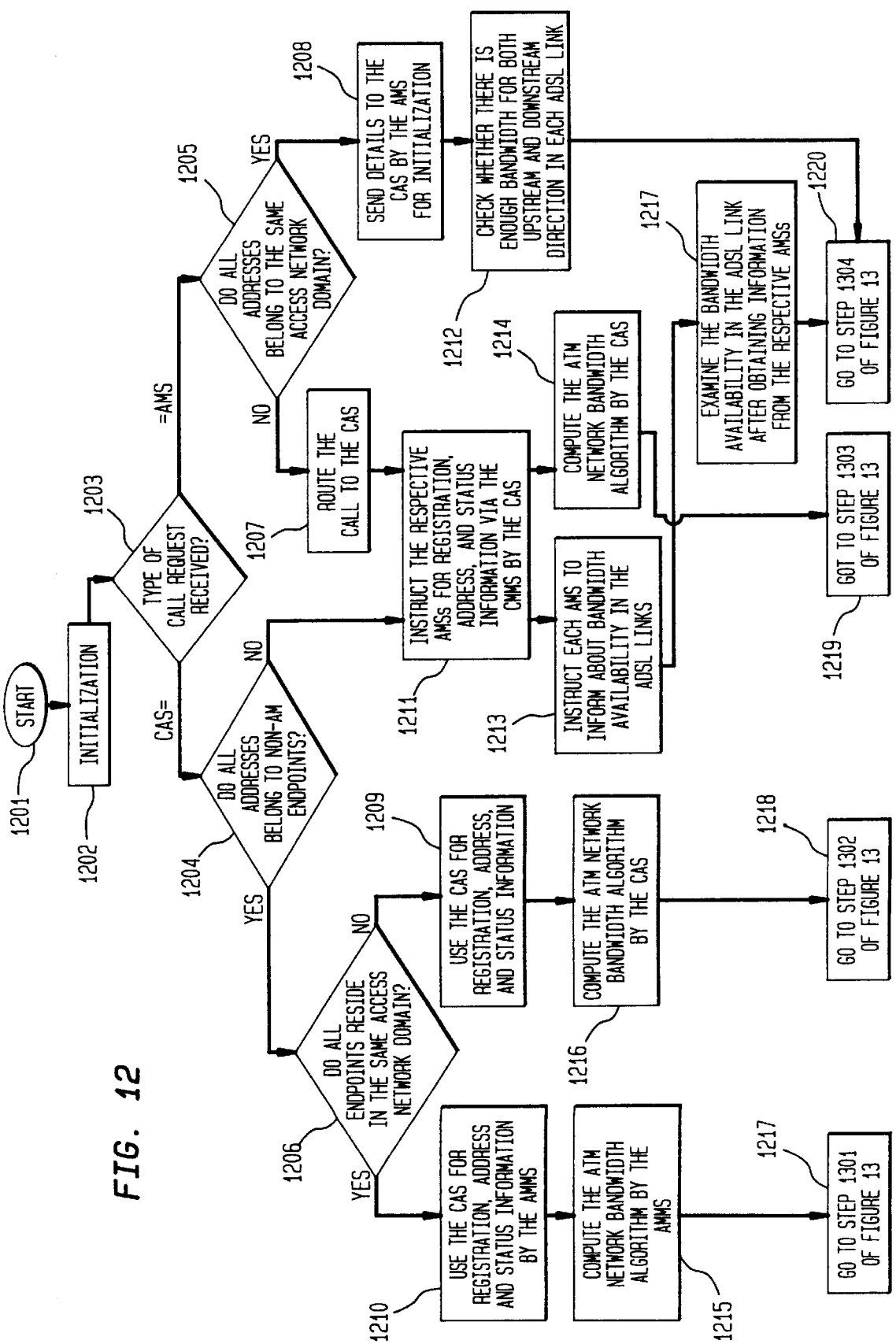
FIGS. 12 and 13 are flow diagrams of one form of a multimedia call control algorithm to set up multimedia communications between participants over an ADSL access network (using ATM ADSL modems to interconnect the premises networks), and an ATM wide area network, using ATM ADSL modem control and signaling protocol, in accordance with the inventive concepts.
Figure 13:
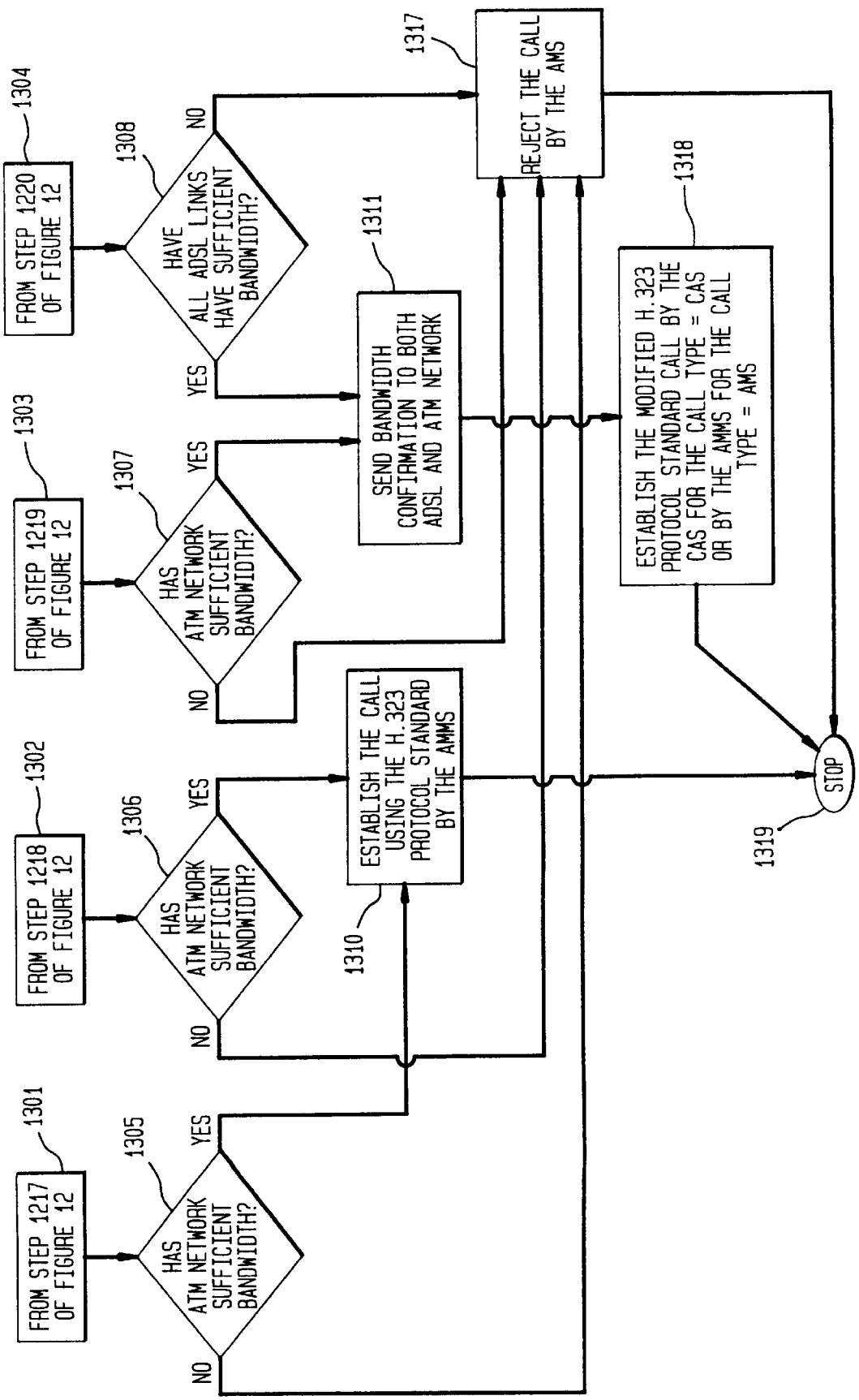

In FIGS. 12 and 13, a flow chart of a preferred form of real-time multipoint, multimedia conference and collaborative services integrated with an ATM ADSL access network consisting of ADSL lines and the ATM wide area network 111-10 is shown in accordance with the invention. The AMsig control and signaling protocol messages have been designed as a feature of the invention, and the AMsig control and signaling protocol messages shown in Table 2 are used to implement the flowcharts of FIGS. 12 and 13 in accordance with the invention.

Figure 14A:
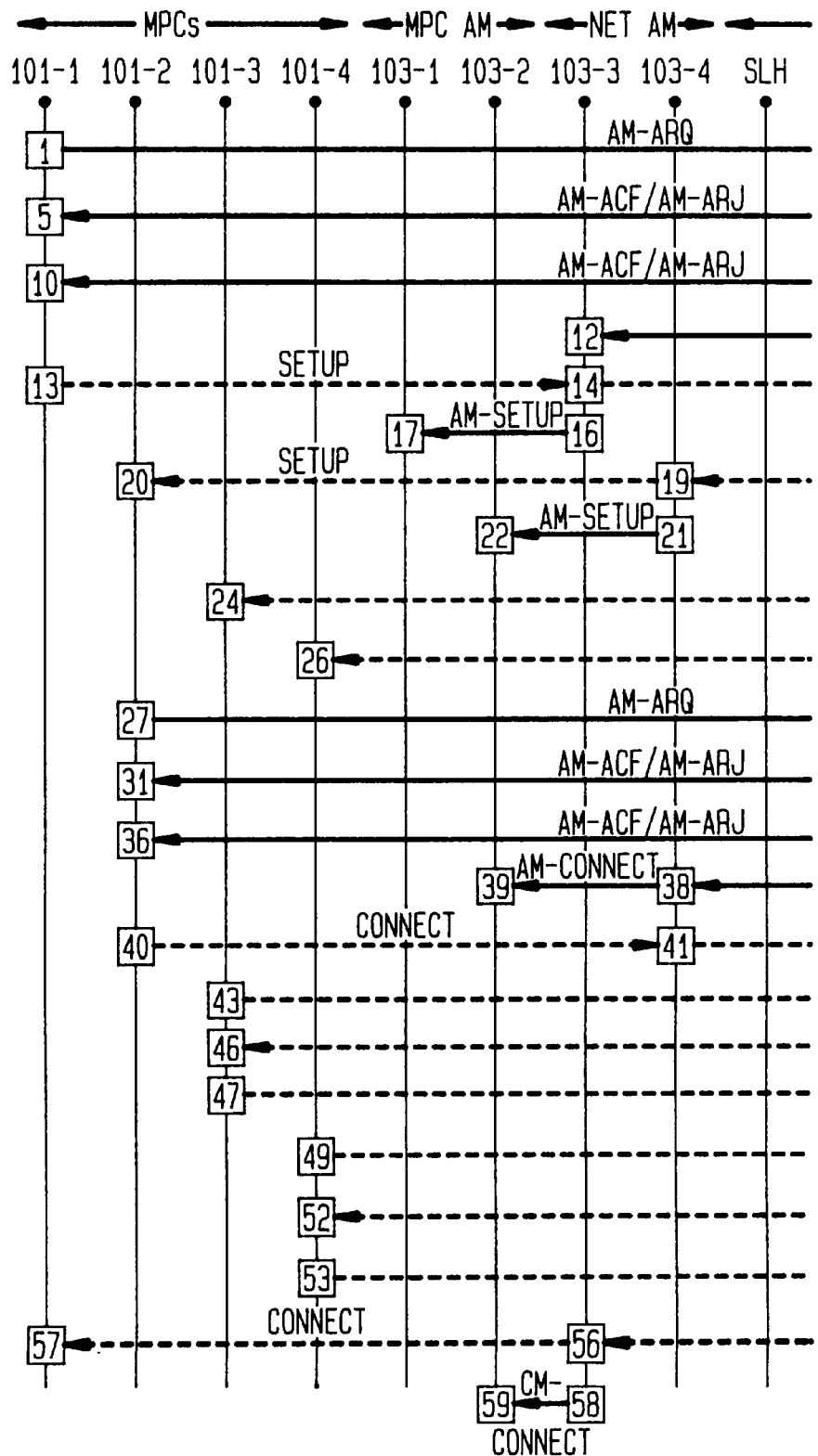
FIGS. 14A and 14B presents an example of multimedia control and signaling protocol message flows (along with ITU-T H.323 signaling protocol) in accordance with the inventive concepts.
Figure 14B:
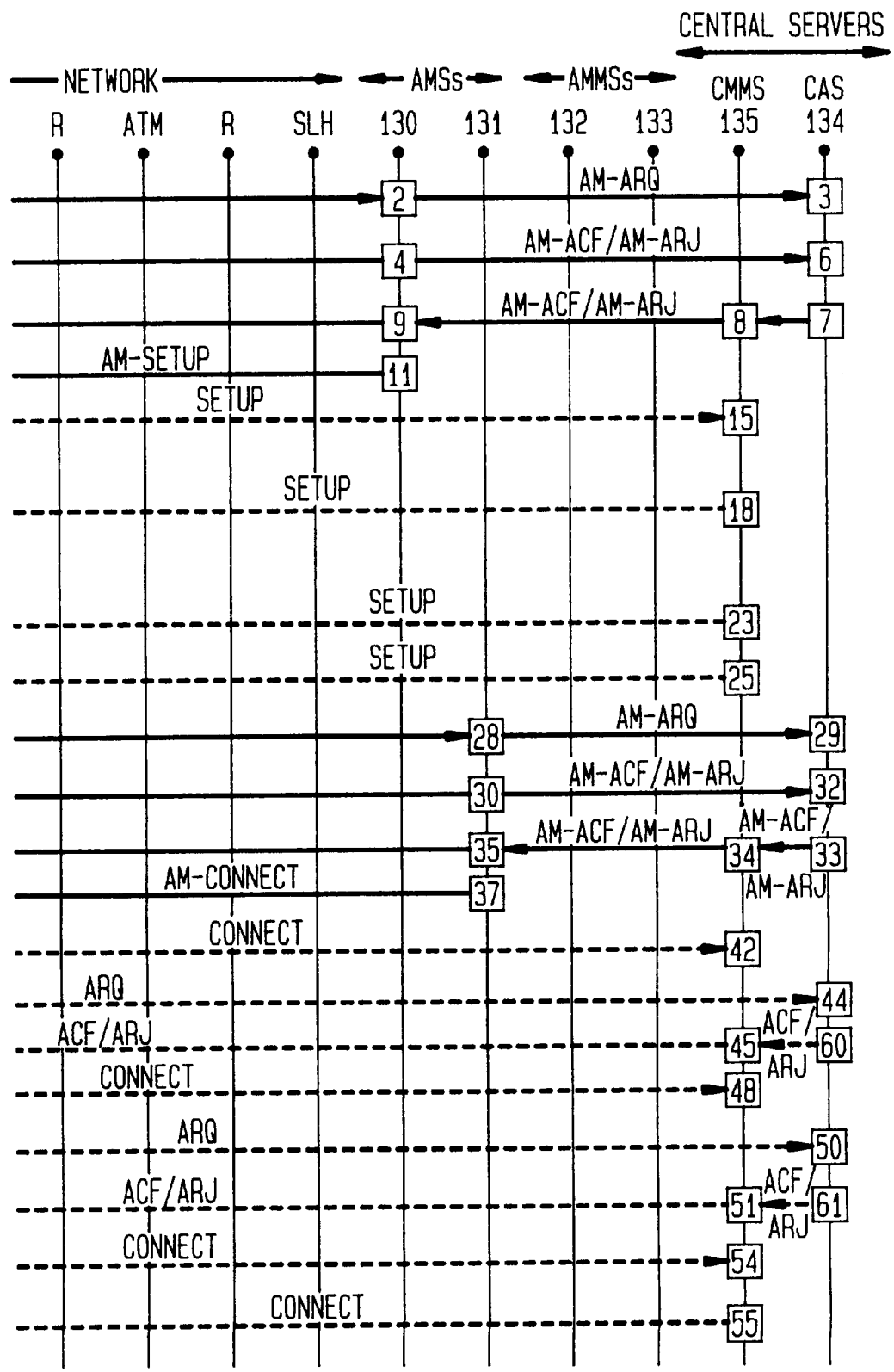

FIGS. 14A and 14B illustrates high-level examples of AMsig control and signaling protocol message flows (along with other standard-based signaling messages) when the flowcharts shown in FIGS. 12 and 13 are executed. Applicant notes that some AMsig control and signaling protocol messages (shown in Table 2), such as AM-call-reject, AM-call-alerting, AM-call-proceeding, and others, have not shown as examples in FIGS. 14A and 14B for simplicity.

Assume that every conferee, known as calling party or calling participant, sets up communication for multipoint multimedia conferencing, either via an ADSL modem server (AMS) [130, 131] of the ATM access network domain (111-5, 111-6) (if the calling party resides in the ATM ADSL modem server-based premises network (170-1, 170-2)) or, via a central ATM network server (CAS) 135 of the ATM backbone network domain (if the calling party resides in the non-ADSL modem premises network (170-3, 170-4)). If all of the conferencing parties are in the same ATM access network domain, the bridging is performed by the access multimedia bridge server (AMMS) [132 or 133] of that ATM access network domain after initialization of the multimedia call via the ADSL modem server of that ATM access network domain, and no involvement of the central ATM network server (CAS) 135 and central multimedia bridge server (CMMS) 134 is required (however, the ADSL modem server [130, 131] will inform the central ATM network server (CAS) 135 that a conference is taking place in the access network domain and will send the details of the conference to CAS 135 for updating the status of the network in a central location).

If the parties are not all in the same ATM access network domain, the involvement of the central ATM network server (CAS) 135 and the central multimedia bridge server (CMMS) 134, of the ATM backbone network domain, is required, in addition to the involvement of the ADSL modem servers of the different ATM access network domains, and multimedia bridging is performed by the central multimedia bridge server (CMMS) 134, without the involvement of any access multimedia bridge servers (AMMSs) [132, 133] of any ATM access network domains. In either situation, a point-to-point communication flow is set up between multimedia bridge server and each end station or end system participating in the conference (e.g., MPC's 101-1 through 101-4) via the hybrid ATM ADSL access network consisting of ADSL lines and the ATM wide area network 111-10. The bridging will be performed in accordance with the criteria setup at the time of conference call (e.g., a bridge (132, 133, or 134) can provide either video switching or video mixing, which are know to those in the art). In addition, the bridge will include functions such as GCC, NC, and MCS as specified in the ITU Rec. T-series standards, as well as AMsig control and signaling protocol messages, in accordance with the invention.

Again referring to FIGS. 12 and 13, the process starts in Step 1201, and initialization is performed in Step 1202 by the MPC (101-1, 101-2, 101-3, or 101-4) to set up the multimedia conference for creating collaborative data application in real-time, with guaranteed performance, in a hybrid communication environment using an ATM ADSL access network consisting of ADSL lines and the ATM wide area network 111-10. At this point the MPC initializes the AM-ARQ control and signaling message of the AMsig scheme (e.g., steps 1 and 2 of FIGS. 14A and 14B), and the process proceeds to Step 1203. In Step 1203, it is determined whether the call has been received by the ADSL modem server (AMS) [130, 131] of the ATM access network domain (e.g., step 2 of FIGS. 14A and 14B) or by the central ATM network server (CAS) [135] (e.g., steps 43 and 44 of FIGS. 14A and 14B). If the call is received by the central ATM network server (CAS) 135, the process proceeds to Step 1204, otherwise the process proceeds to Step 1205.

In Step 1205, it is determined by the ADSL modem server (AMS) [130, 133] whether the addresses of all calling and called end points of the conference call (e.g., step 2 of FIGS. 14A and 14B) reside in the same ATM access network domain. If the determination is affirmative, the process continues to Step 1208, otherwise the process continues to Step 1207. In Step 1208, the ADSL modem server (AMS) [130, 131] sends the details of the conference to the central ATM network server (CAS) 135 using AM-ARQ message (e.g., steps 2 and 3 of FIGS. 14A and 14B) for updating the information related to registration, address, and status, although the conference will be confined only within the ATM access network domain (111-5, 111-6). The process then proceeds to Step 1212 where the ADSL modem server (AMS) [130, 131] examines the ADSL lines of that ATM access network domain (111-5 or 111-6) that is involved with the multimedia conferencing call, to determine if each line has sufficient two-way bandwidth, along with the availability of resources in the ATM access node/switch (107-1, 107-2). Note that an ADSL modem server (AMS) [130 or 131] always sends a bandwidth confirmation (AM-ACF) or rejection (AM-ARJ) message (e.g., steps 4 through 6 of FIGS. 14A and 14B) for the ATM ADSL access network, as soon as it determines that it has sufficient information to make the decision, either before or after communication with the central ATM network server (CAS) 135.

If the addresses of all calling and called end points do not reside in the same ATM access network domain, in Step 1207, the ADSL modem server (AMS) [130, 131] routes the call of the calling party to the central ATM network server (CAS) 135 by relaying the AM-ARQ control and signaling protocol message of the AMsig scheme (e.g., steps 2 and 3 of FIGS. 14A and 14B), and the process proceeds to Step 1211, where the central ATM network server (CAS) 135 examines the details of conference participating parties and determines whether there are ADSL modem and non-ADSL modem based premises network end points (e.g., step 3 of FIGS. 14A and 14B). The central ATM network server (CAS) 135 instructs the details for registration, address, and status information to the corresponding the ADSL modem server (AMS) [130, 131] via the central multimedia bridge server (CMMS) 134 of the ATM backbone network domain 111-9 using the AM-ACF or AM-ARJ message of the AMsig control and signaling protocol scheme (e.g., steps from 7 through 9 of FIGS. 14A and 14B). As mentioned earlier, each multimedia bridge server (132, 133, 134) will have an entity known as gatekeeper (GK), as envisioned in the ITU-T H.323 standard, and the capability of the same gatekeeper, accordance with this invention, is also extended to handle the AMsig control and signaling messages for providing multimedia conferencing services in hybrid networking environment that includes both the hybrid ATM ADSL access network consisting of ATM ADSL lines and the ATM wide area network 111-10 (e.g., AMsig control and signaling protocol messages used in conjunction with ITU-T's H.323 control and signaling protocol messages in steps 1 through 59 of FIGS. 14A and 14B).

The process is then divided into two continuing steps: Step 1213, for computation of the bandwidth availability in the ADSL access network by the ADSL modem server (AMS) [130, 131], and Step 1214, for computation of the bandwidth within the ATM wide area network 111-10 by the central ATM network server 135 (various bandwidth computation algorithms, either for the ATM ADSL access network or for the ATM wide area network 111-10, are known in the art and are not part of the invention).

More particularly, in Step 1213, the central ATM network server (CAS) 135 instructs the central multimedia bridge server (CMMS) 134 to request that the ADSL modem server (AMS) [130, 131] of the respective ATM network domain (111-5, 111-6) compute the respective bandwidth requirement for the ATM ADSL access network, using AM-ACF or AM-ARJ control and signaling messages of the AMsig scheme (e.g., steps 7 through 9 and steps 33 through 35 of FIGS. 14A and 14B). The process then continues to Step 1217, where the ADSL modem server (AMS) [130, 131] of the respective ATM network domain (111-5, 111-6) communicates with the ATM ADSL modem of the ATM node/switch, for connection setup using AM-setup message of the AMsig control and signaling protocol scheme (e.g., steps 11 and 12 of FIGS. 14A and 14B), after determining that the bandwidth of the ADSL access network is available, based on the information already obtained, since the ATM ADSL modem of the ATM switch will be allocating the bandwidth of the ATM ADSL access network to all users. The process then proceeds to Step 1308 of FIG. 13 (via Step 1220 of FIG. 12 and Step 1304 of FIG. 13).

Returning to Step 1214, the central ATM network server (CAS) 135 itself computes the ATM network bandwidth requirement algorithm, and the process continues to Step 1307 of FIG. 13 (via Step 1219 of FIG. 12 and Step 1303 of FIG. 13).

If a determination was made that the call was received by the central ATM network server (CAS) 135, in Step 1204, the central ATM network server (CAS) 135 examines whether all of the addresses of the conference participants belong to non-ADSL modem premises networks. If not, the process proceeds to Step 1211, since the call contains a mixture of both ADSL modem and non-ADSL modem based premises network end points. Otherwise, the process continues to Step 1206, where the central ATM network server (CAS) 135 examines whether all the addresses of the conference participants belong to the same ATM access network domain (111-5 or 111-6). If so, the process proceeds to Step 1210, where the central ATM network server (CAS) 135 is used by the access multimedia bridge server (AMMS) [132, 133] to obtain registration, address, and status information from the central ATM network server (CAS) 135 to set up the multimedia conference call, since all non-ADSL modem premises network-based conference participants remain in the same ATM access network domain (111-5, 111-6). The process then proceeds to Step 1215, where the access multimedia bridge server (AMMS) [132, 133] computes the ATM network bandwidth requirement algorithm within the ATM access network domain (111-5, 111-6) for the multimedia conference call and updates the status of the conference call with the central ATM network server 135 (the illustrative AMsig signaling message flows between ADSL modem servers [130, 131], access MMB servers [132,133], ADSL modems [103-1, 103-3, 103-2, 103-4] and MPCs [101-1, 101-2, 101-3, 101-4] are not shown in FIGS. 14A and 14B for simplicity). The process then proceeds to Step 1305 of FIG. 13 (via Step 1217 of FIG. 12 and Step 1301 of FIG. 13). If all endpoints do not reside in the same access network domain in Step 1206, in Step 1209, the central multimedia bridge server (CMMS) 134 obtains the registration, address, and status information from the central ATM network server (CAS) 135 and proceeds to Step 1216, where the central ATM network server 135 computes the ATM network bandwidth requirement algorithm and sends the information (e.g., steps 60 and 45 of FIGS. 14A and 14B) to the central multimedia bridge server (CMMS) 135 of the ATM network backbone network domain 111-9. In fact, the multimedia conference call is set up using the ITU-T H.323 standard based control and signaling protocol messages (e.g., steps 40 through 57 of FIGS. 14A and 14B), since the conference call will be established by the central multimedia bridge server (CMMS) 134 in non-ADSL modem premises-based end points environment only, and then the process continues to Step 1306 of FIG. 13 (via Step 1218 of FIG. 12 and Step 1302 of FIG. 13).

In Step 1308, the ADSL modem server (AMS) [131, 132] of the given ATM network domain (111-5, 111-6) examines whether there is sufficient bandwidth available in the ATM ADSL access network to accept the multimedia conference call (note that this functionality of the ADSL modem server enables the design of the ATM ADSL modem to be less complicated, as it is not involved in the computation of the bandwidth requirement of the ADSL access network; in addition, the ATM ADSL modem is also not involved in the processing of AM-ACF or AM-ARJ complex message sets). If the ADSL modem server determines that there is sufficient bandwidth available in the ADSL access network, the process proceeds to Step 1311. If a determination is made in Step 1308 that there is not sufficient bandwidth, the process stops in Step 1319 via Step 1317, which rejects the call by the ADSL modem server (AMS) [130, 131] due to insufficient bandwidth in the ADSL access network.

In Step 1311, the ADSL modem server (AMS) [130, 131] instructs the ATM ADSL modem of the ATM node/switch to assign the desired priority levels with a proper quality of service parameter (QOS) to accommodate the required bandwidth for the multimedia conference call in the ADSL access network. The ADSL modem server sends either AM-setup message (e.g., steps 11 and 12 of FIGS. 14A and 14B in the case of the calling party) or CM-connect message (e.g., steps 37 and 38 of FIGS. 14A and 14B in the case of the called party), and the ATM ADSL modem of the ATM node/switch then sends the same message to the corresponding ATM ADSL modem of the ADSL modem-based customer premises (e.g., steps 16–17, and 38–39 of FIGS. 14A and 14B). The signaling functional entity (510, 511, 512 of FIG. 5) of ATM ADSL modem of the ATM node/switch translates the required parameters of AM-setup and AM-connect messages of the AMsig control and signaling scheme into appropriate control and signaling protocol messages of the H.225.0 scheme of the ITU-T standard. The ADSL modem server (AMS) [130, 131] informs the central ATM network server (CAS) 135, as well as MPC's (101-1, 101-2) of the premises networks (170-1, 170-2), of the confirmation of the bandwidth of the ADSL access network (e.g., AM-ACF message of the AMsig scheme is used to confirm the bandwidth of the ADSL access network as shown in steps 4 through 6—note that steps 11 through 12 and 16 through 17 can be executed in parallel with steps 4 through 6—similarly, steps 30 through 32 can run in parallel with steps 37 through 39, all in FIGS. 14A and 14B). The bandwidth confirmation message for both the ADSL access network and the ATM network is sent to all conference participants including non-ADSL modem premises network-based end points.

The process continues to Step 1318, in which a modified ITU-T H.323 protocol-based conference call, that includes AMsig control and signaling messages of the invention, is established by the central ATM network server (CAS) 135 if the call type is central ATM network server (CAS) [e.g., steps 37 through 59 of FIGS. 14A and 14B] or by the by the access multimedia bridge server (AMMS) [130, 131] if the call type is ADSL modem server (AMS). The process then proceeds to Step 1319, at which the process ends.

In Step 1307, the central ATM network server (CAS) 135 determines whether there is a sufficient bandwidth available with the ATM network to accept the multimedia conferencing call (e.g., step 3 of FIGS. 14A and 14B). If there is sufficient bandwidth, the process proceeds to Step 1311, otherwise, the process proceeds to Step 1317, where the central ATM network server (CAS) 135 sends a message to all conference participants that the call has been rejected due to insufficient bandwidth. The process then ends at Step 1319.

In Step 1305, the access multimedia bridge server (AMMS) [132, 133] determines whether there is sufficient bandwidth available with the ATM network to accept the multimedia conferencing call. If there is sufficient bandwidth available in the ATM network, the process proceeds to Step 1310, otherwise the process proceeds to Step 1317, where the access multimedia bridge server (AMMS) [132, 133] sends a message to all conference participants that the call has been rejected due to insufficient bandwidth, and the process ends at Step 1319. In Step 1310, an ITU-T H.323 protocol-based conference is established by the access multimedia bridge server (AMMS) [132, 133] and the process ends in Step 1319.

In Step 1306, the central ATM network server (CAS) 135 determines whether there is sufficient bandwidth available with the ATM network to accept the multimedia conferencing call. If there is sufficient bandwidth, the process continues to Step 1310, where an ITU-T H.323 protocol based conference call is established by the central multimedia bridge server (CMMS) 134 and the process ends in Step 1319.

ADSL provides dedicated bandwidth and secure communications. In accordance with the invention, the MPC's (101-1, 101-2) within the premises ADSL modem-based networks use switched local area network hubs (SLHs) and ATM ADSL modems for communication between the ADSL access network and the ATM network 111-10. Multimedia bridge servers are also connected to the ATM network via switched local area network hubs (SLHs). As a result, a multimedia conference, as well as high-quality content created through collaborative efforts over the hybrid networking environment via real-time multimedia conferencing, will have guaranteed performance if the switched local area network hubs operate within specified performance guidelines. In addition, the non-ADSL modem computers (101-3, 101-4) of the premises networks also use switched local area network hubs (SLHs) and ATM ADSL modems for communication between the premises network and the ATM wide area network 111-10. Consequently, multimedia conferencing that includes both ADSL modem-based and non-ADSL modem-based computers (101-1 through 101-4) will also have guaranteed performance for both multimedia conferencing, and collaborative content created through conferencing, provided that the switched local area network hubs operate within specified performance guidelines.

What is claimed is:

1. A system for providing real-time multipoint multimedia conferencing services, to a dispersed plurality of locations connected to an ATM wide area network (WAN), the system comprising:

an ATM wide area network including an ATM backbone network domain and at least one ATM access network domain;

a headend station-based ATM ADSL modem utilizing a multimedia ADSL modem control and signaling (AMsig) scheme that ensures bandwidth over the ADSL access network as well as within the wide area ATM network wherein said ADSL modem is designed to carry real-time multipoint signals to a plurality of users.

2. A system according to claim 1, wherein the number of ATM access network domains in the WAN is based on the size of the WAN.

3. A system according to claim 2, wherein each ATM access network domain includes at least one access multimedia bridge server and at least one ADSL modem server.

4. A system according to claim 3, wherein the ATM backbone network domain includes at least one central multimedia bridge server and at least one central ATM network server.

5. A system according to claim 4, wherein each ATM access network domain includes an ATM access node/switch connected to an ATM node/switch of the ATM backbone network domain.

6. A system according to claim 5, wherein the ADSL modem server and the access multimedia bridge server in each ATM access network domain is connected to the ATM access node/switch in said access network domain.

7. A system according to claim 5, wherein a headend station-based ATM ADSL modem is connected to the ATM access node/switch in said ATM access network domain.

8. A system according to claim 4, wherein if a location includes an ATM ADSL modem, an ADSL line connects the location to an ATM access network domain within the WAN.

9. A system according to claim 4, wherein if a location does not include an ATM ADSL modem, an ATM connection is provided directly to the ATM backbone network domain or to an ATM access network domain access node.

10. A system according to claim 8, wherein the plurality of locations in a multimedia conference call are all connected to a single ATM access network domain.

11. A system according to claim 10, wherein the ADSL modem server of the ATM access network domain coordinates a multimedia conference call with the central ATM network server, including maintaining address information of all ADSL modem-based locations within said ATM access network domain, maintaining bandwidth availability information for all ATM access networks within said ATM access network domain, coordinating bandwidth allocation, and coordinating conferencing information with the central ATM network server.

12. A system according to claim 11, wherein the access multimedia bridge server of the ATM access network domain coordinates a multimedia conference call with the ADSL modem server of the ATM access network domain and with the central multimedia bridge server, including, coordinating receiving multimedia signals from the locations within the ATM access network domain for bridging, and, transmitting the bridged signals to the locations.

13. A system according to claim 8, wherein the locations in a multimedia conference call are connected to a plurality of ATM access network domains.

14. A system according to claim 13, wherein the central ATM network server of the ATM backbone network domain coordinates a multimedia conference call with all ATM access network domains having locations involved in the conference call, including, coordinating conferencing information, maintaining address information of all locations, maintaining bandwidth availability information for all access networks, and, coordinating bandwidth allocation.

15. A system according to claim 14, wherein the central multimedia bridge server of the ATM backbone network domain coordinates a multimedia conference call with the central ATM network server of the ATM backbone network domain, including, coordinating receiving multimedia signals from the ADSL modem-based locations and non-ADSL modem-based locations within the plurality of ATM access network domains, for bridging, and, transmitting the bridged signals to the locations.

16. A system according to claim 8, wherein a functional component architecture of an ATM ADSL modem at a location comprises two logical entities, a local area network medium access control and ATM protocol conversion system, and a modulation/demodulation for the digital subscriber line system, and further wherein the two logical entities can be separate physical entities or a single combined entity.

17. A system according to claim 16, wherein the local area network medium access control and ATM protocol conversion entity of the ATM ADSL modem further comprises a local area network (LAN) controller, medium access control (MAC) protocol to ATM protocol conversion with the segmentation and reassembly (SAR) function, ATM protocol to medium access control (MAC) protocol conversion along the segmentation and reassembly (SAR) function, an asymmetric digital subscriber line (ADSL) control and signaling entity (AMsig), random access memory (RAM) buffers, and an ATM cell processor, and further wherein the LAN controller controls traffic flow of the IEEE standard-based Ethernet (EN), Token Ring (TN), or Fiber Distributed Data Interface (FDDI), further wherein the MAC protocol to ATM protocol conversion with SAR function entity converts LAN traffic, coming from MPC's to the ADSL access network, to ATM cells, after performing the segmentation and reassembly (SAR) function, and transfers the ATM cells to random access memory buffers of the LAN MAC and ATM protocol entity, further wherein the ATM protocol to MAC protocol conversion with SAR function entity converts the ATM cells of LAN traffic, coming from the ATM WAN to MPC's, via the random access memory buffers of the LAN MAC and ATM protocol entity after performing the segmentation and reassembly (SAR) function via the LAN controller, further wherein the AMsig entity implements a control and signaling scheme that controls the RAM buffers, ATM protocol to MAC protocol conversion, and MAC protocol to ATM protocol conversion, further wherein RAM buffers store ATM cells coming to and from the ATM cell processor, the MAC protocol to ATM protocol conversion entity and the ATM protocol to MAC protocol conversion entity; and further wherein the ATM cell processor receives ATM cells from a demodulation entity, in the a modulation/demodulation for the digital subscriber line system, and the RAM buffers, and transmits the ATM cells to a modulation entity, in the modulation/demodulation for the digital subscriber line system, in accordance with control and signaling messages received from the AMsig entity.

18. A system according to claim 16, wherein the modulation/demodulatin for the digital subscriber line system further comprises a modulation entity, a demodulation entity, a digital to analog conversion system, an analog to digital conversion system, and line coupling/POTS splitter, wherein the modulation entity provides modulation of digital signals to be transferred over the ADSL access network, wherein the demodulation entity demodulates digital signals received from the ADSL access network, wherein the digital to analog conversion system converts digital signals into analog signals for transferring over the ADSL access network, wherein the analog to digital conversion system converts the analog signal into digital bit streams to be transferred to an MPC, and further wherein the line coupling/POTS splitter transfers analog signals from the digital to analog conversion system over the ADSL access network and receives analog signals from the ADSL access network and transfers the received signals to the analog to digital conversion system.

19. A system according to claim 8, wherein a protocol architecture of an ATM ADSL modem at a location comprises a first protocol stack for processing signaling information and a second protocol stack for transferring information other than signaling information, wherein in said first protocol stack, AMsig control and signaling messages are processed using an ATM adaptation layer (AAL), and ATM protocol, and further wherein said second protocol stack is divided into two protocol stacks, wherein LLC and MAC protocols transfer information, other than signaling information, from the ADSL access network to an MPC at the location, and AAL, ATM protocols transfer information, other than signaling information, from an MPC at the location to the ADSL access network.

20. A system according to claim 8, wherein a functional component architecture of a headend station-based ATM ADSL modem at an ATM access network domain comprises two logical entities, the entities providing a modulation/demodulation system for the digital subscriber line, and an ATM and other higher layer protocol system, and further wherein the two logical entities can be separate physical entities or a single combined entity.

21. A system according to claim 20, wherein the modulation/demodulation system for the digital subscriber line further comprises a modulation entity, demodulation entity, digital to analog conversion system, analog to digital conversion system, and a line coupling/POTS splitter, and further wherein the modulation entity modulates digital signals to be transferred over the ADSL access network, and further wherein the demodulation entity demodulates digital signals received from the ADSL access network, and further wherein the digital to analog conversion system converts the digital signal into analog form to be transferred over the ADSL access network, and further wherein the analog to digital conversion system converts the analog signal into digital bit streams to be transferred to an MPC at the location, and further wherein the line coupling/POTS splitter transfers analog signals from the digital to analog conversion system over the ADSL access network and receives analog signals from the ADSL access network and transfers the received signals to the analog to digital conversion system.

22. The system according to claim 20, wherein the ATM and other higher layer protocol system further comprises an asymmetric digital subscriber line (ADSL) control and signaling entity (AMsig), a signaling entity, an H.225.0/AMsig entity, a protocol conversion entity, ATM buffers and an ATM cell processor, wherein the ADSL signaling (AMsig) entity implements AMsig control and signaling protocol functions, wherein the signaling entity provides inter-signaling conversion functions between the AMsig and the AMsig/H.225.0 entities, wherein the H.225.0/AMsig entity provides a hybrid mixture of H.225.0 control and signaling messages and AMsig control and signaling messages and provides inter-signaling communication between AMsig and H.225.0/Amsig with conversion when necessary, wherein the protocol conversion entity provides protocol conversion between UDP, IP and ATM, including segmentation and reassembly function, wherein the ATM buffers store ATM cells, coming to and from the ATM cell processor, the ATM node/switch of the ATM backbone network domain, and the protocol conversion entity, in accordance with the AMsig entity, wherein the ATM cell processor receives ATM cells from the demodulation entity of the modulation/demodulation system for the digital subscriber line and the ATM buffers, and transmits the ATM cells to the modulation entity of the modulation/demodulation system for the digital subscriber line and to the ATM buffers, in accordance with control and signaling messages received from the AMsig entity, and the AMsig/H.225.0 entity.

23. The system according to claim 8, wherein a protocol architecture of a headend station-based ATM ADSL modem comprises a first protocol stack for processing signaling messages and a second protocol stack for transferring information other than signaling messages, wherein said first protocol stack is further divided into a first divided first protocol stack and a second divided first protocol stack, wherein AMsig control and signaling messages are processed using segmentation and reassembly (SAR) function, ATM adaptation layer (AAL) and ATM protocol, all in the first divided first protocol stack, and, wherein AMsig and H.225.0 control and signaling protocol messages are processed using UDP/TCP, IP, AAL and ATM protocol, and are transferred over the ATM network, all in the second divided first protocol stack, wherein a higher layer signaling entity in the first protocol stack provides intersignaling communication between AMsig and AMsig/H.225.0, further wherein said second protocol stack is further divided into a first divided second protocol stack and a second divided second protocol stack, wherein ATM adaptation layer (AAL) and ATM protocols transfer information, other than signaling information, between an ADSL modem at a location and a headend station, over the ADSL access network, all in the first divided second protocol stack, and, wherein IP, AAL and ATM protocols transfer information, other than signaling information between an ADSL modem at the headend station and an ATM switch/node at the ATM network, all in the second divided second protocol stack.

24. A system according to claim 8, wherein a control and signaling protocol method, for initialization of a multimedia conference call and transferring of traffic over the ADSL access network and the ATM WAN, comprises:

setting up a multimedia conference call by an ATM ADSL modem-based location, over the ADSL access network, with a headend station-based ATM ADSL modem connected to the ATM access node/switch of the ATM access network domain, for a multimedia conference call wherein all locations are ATM ADSL modem-based and within the ATM access network domain, and setting up a multimedia conference call by an ATM ADSL modem-based location, over the ADSL access network, with a headend station-based ATM ADSL modem connected to the ATM backbone network domain, for a multimedia conference call wherein not all locations are ATM ADSL modem-based or within a same ATM access network domain.

25. A method for providing real-time multimedia conferencing services, to a system according to claim 4, the method comprising the steps of:

determining if control and signaling protocol messages should be received by the ADSL modem server of the ATM access network domain or by the central ATM network server of the ATM backbone network;

determining whether the multimedia conference call will be accepted based on a determination of the computed bandwidth requirement in the ADSL network and the ATM wide area network, and determining whether multimedia bridging will be performed by the access multimedia bridge server of the access network domain or by the central multimedia bridge server of the backbone network domain.

26. A method according to claim 25, wherein the ADSL modem server of an access network domain sets up the multimedia conference call if all locations of conference participants in the call are ADSL modem-based locations all within the access network domain, and wherein the central network server of the backbone network domain, together with ADSL modem servers of all access network domains having locations with participants in the multimedia conference call, set up the multimedia conference call if all locations in the call are not within a same access network domain, or, if there is a combination of ADSL modem-based locations and non-ADSL modem-based locations, or, if there is only non-ADSL modem-based locations.

27. A method according to claim 26, wherein the access multimedia bridge server bridges multimedia signals if all locations of conference participants are ADSL modem-based and if all locations are connected to a same access network domain, and wherein the central multimedia bridge server of the backbone network domain bridges multimedia signals if, locations of ADSL modem-based conference participants are in more than one access network domain, if there is a combination of ADSL modem-based conference participants and non-ADSL modem-based conference participants, or, if there are only non-ADSL modem-based conference participants.

28. A method for providing real-time multipoint multimedia conferencing services to a plurality of participants in a hybrid communication environment, comprising:

providing intelligent multimedia ADSL modem control and signaling (AMsig) messages used in conjunction with ITU-T H.323 control and signaling protocol messages;

determining if the AMsig/H.323 messages should be received by an ADSL modem server; and establishing a real-time multipoint conference call by an access multimedia bridge server if the message should be received by the ADSL modem server.

29. The method of claim 28, wherein the step of determining if AMsig/H.323 messages should be received comprises determining if all calling and called end points of the conference call reside in the same ATM access network domain; and routing the call to a central ATM network server by relaying AMsig/H.323 messages if the calling and called end points do not reside in the same ATM access network domain.

30. The method of claim 29, further comprising:

examining ADSL lines to determine if each line has sufficient two-way bandwidth; and rejecting the call by the ADSL modem server if bandwidth is not sufficient.

31. The method of claim 28, further comprising:

sending details of the conference call to a central ATM network server using AMsig/H.323 messages.

32. The method of claim 31, wherein the details are for updating information related to registration, address, and status of the conference call.

33. The method of claim 28, further comprising:

translating parameters of AMsig/H.323 messages into appropriate control and signaling messages of ITU-T H.225.0.

34. A method for providing real-time multipoint multimedia conferencing services to a plurality of participants in a hybrid communication environment, comprising:

providing intelligent multimedia ADSL modem control and signaling (AMsig) messages used in conjunction with ITU-T H.323 control and signaling protocol messages;

determining if the AMsig/H.323 messages should be received by a central ATM network server; and establishing a real-time multipoint conference call by a central multimedia bridge server if the message should be received by the central ATM network server.

35. The method of claim 34, wherein the step of determining if the AMsig/H.323 messages should be received comprises determining if all addresses of conference participants belong to non-ADSL modem premises networks or contain a mixture of ADSL and non-ADSL modem based premises network endpoints.

36. The method of claim 35, further comprising:

determining if all non-ADSL addresses of the conference participants belong to the same ATM access network domain; and obtaining registration, address, and status information to set up the multimedia conference call if all non-ADSL addresses belong to the same ATM access network domain.

37. The method of claim 34, further comprising:

computing an ATM network bandwidth requirement algorithm for the multimedia conference call;

determining if there is sufficient bandwidth available to accept the call; and rejecting the call if there is insufficient bandwidth.

38. A method for providing real-time multipoint multimedia conferencing services to a plurality of participants in a hybrid communication environment, comprising:

providing a multimedia ADSL modem control and signaling (AMsig) scheme that ensures bandwidth over a ADSL access network as well as within a wide area ATM network;

determining if the AMsig scheme should be received by an ADSL modem server or a central ATM network server; and establishing a real-time multipoint conference call by an access multimedia bridge server if the message should be received by the ADSL modem server or by a central multimedia bridge server if the message should be received by the central ATM network server.

* * * * *